(12) United States Patent
Ni et al.

(10) Patent No.: US 11,057,432 B2
(45) Date of Patent: Jul. 6, 2021

(54) CREATION OF SECURITY POLICIES USING A VISUAL APPROACH

(71) Applicant: Nutanix, Inc., San Jose, CA (US)

(72) Inventors: Julie Ni, San Francisco, CA (US); Ken Chen, San Francisco, CA (US); Ravikanth Samprathi, San Jose, CA (US); Sridhar Joseph Devarapalli, Fremont, CA (US); Viraj Sapre, Sunnyvale, CA (US); Rajesh P. Bhatt, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 421 days.

(21) Appl. No.: 15/949,901

(22) Filed: Apr. 10, 2018

(65) Prior Publication Data

US 2019/0342335 A1 Nov. 7, 2019

(51) Int. Cl.
*H04L 29/06* (2006.01)
*G06F 9/455* (2018.01)
*H04L 12/24* (2006.01)
*G06F 3/0484* (2013.01)

(52) U.S. Cl.
CPC .......... *H04L 63/20* (2013.01); *G06F 9/45558* (2013.01); *G06F 3/04847* (2013.01); *G06F 2009/45579* (2013.01); *G06F 2009/45587* (2013.01); *G06F 2009/45595* (2013.01); *H04L 41/22* (2013.01)

(58) Field of Classification Search
CPC ... H04L 63/20; H04L 63/168; H04L 63/0263; H04L 63/0236; H04L 63/145; G06F 9/45558; G06F 2009/45595
See application file for complete search history.

(56) References Cited

U.S. PATENT DOCUMENTS

| 8,549,518 | B1 | 10/2013 | Aron et al. |
| 8,601,473 | B1 | 12/2013 | Aron et al. |
| 8,850,130 | B1 | 9/2014 | Aron et al. |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Shanto Abedin
(74) *Attorney, Agent, or Firm* — Vista IP Law Group, LLP

(57) ABSTRACT

A request to create a set of security policies for an application is received at a graphical user interface. Information identifying a set of source VMs, a set of destination VMs, and a set of target VMs also are received, wherein the target VMs are executing the application and are supported by (a) node(s) in a clustered virtualization environment. A set of inbound rules identifying (a) category(ies) of source VMs permitted to initiate connections with a subset of target VMs and a set of outbound rules identifying (a) category(ies) of destination VMs to which the subset of target VMs are permitted to initiate connections are received at the graphical user interface. Upon receiving a request to apply the security policies, the policies are configured based at least in part on the inbound and outbound rules and a visual representation of the security policies is presented in the graphical user interface.

21 Claims, 21 Drawing Sheets

(56) References Cited

U.S. PATENT DOCUMENTS

| | | | | |
|---|---|---|---|---|
| 9,772,866 | B1 | 9/2017 | Aron et al. | |
| 10,469,304 | B1* | 11/2019 | Kempe | H04L 41/12 |
| 2006/0041936 | A1* | 2/2006 | Anderson | H04L 63/02 |
| | | | | 726/11 |
| 2008/0301759 | A1* | 12/2008 | Rivers | H04L 47/20 |
| | | | | 726/1 |
| 2013/0061169 | A1* | 3/2013 | Pearcy | G06F 21/50 |
| | | | | 715/788 |
| 2014/0047081 | A1* | 2/2014 | Edwards | H04L 63/0272 |
| | | | | 709/220 |
| 2014/0047503 | A1* | 2/2014 | Marshall | H04L 63/20 |
| | | | | 726/1 |
| 2016/0359915 | A1* | 12/2016 | Gupta | H04L 63/20 |
| 2017/0359306 | A1* | 12/2017 | Thomas | H04L 63/145 |
| 2018/0032362 | A1* | 2/2018 | Buil | H04L 67/10 |
| 2018/0145986 | A1* | 5/2018 | Chien | H04L 63/0236 |
| 2018/0152417 | A1* | 5/2018 | Jain | H04L 63/0263 |
| 2018/0159826 | A1* | 6/2018 | YiSan | H04L 63/0236 |
| 2018/0183757 | A1* | 6/2018 | Gunda | H04L 63/0218 |
| 2019/0081873 | A1* | 3/2019 | Kraft | H04L 63/02 |
| 2019/0230126 | A1* | 7/2019 | Kumar | H04L 45/64 |
| 2019/0251258 | A1* | 8/2019 | Walters | G06F 21/577 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Cano, I. et al., "Curator: Self-Managing Storage for Enterprise Clusters", 14th USENIX Symposium on Networked Systems Design and Implementation, NSDI '17, (Mar. 27, 2017).

* cited by examiner

FIG. 3A

Home  Explore  Analysis  Alerts                Q  ?  ⚙  ☐  User 1 — 103

| Entities | 19 |
|---|---|
| VMs | 4 |
| Clusters | 4 |
| Hosts | 4 |
| Disks | 4 |
| Categories | 4 |
| Security Policies | 3 |

— 302

[ + Create Security Policy ] — 304

[_____] — 306

≡ ∷  — 308

1-3 of 3  < >  — 310

3 Total Security Policies — 320

| | NAME 322 | PURPOSE 324 | POLICY TYPE 326 | STATUS 328 | LAST MODIFIED 330 |
|---|---|---|---|---|---|
| ☐ | Exchange Security | Secure Exchange | [4 src.] — [App Type Exch. & Env Prod.] — [1 dest.] | ■ Applied | 01/02/17, 11:34:23 am |
| ☐ | New Isolation Policy | Isolate prod & dev | [Env Prod & Dept HR] [Env Dev & Dept HR] | ■ Monitoring | A few seconds ago |
| ☐ | Quarantine (Default) | Isolate threats | [Quarantined   0 VMs] | Applied | 01/02/17, 11:34:23 am |

— 340

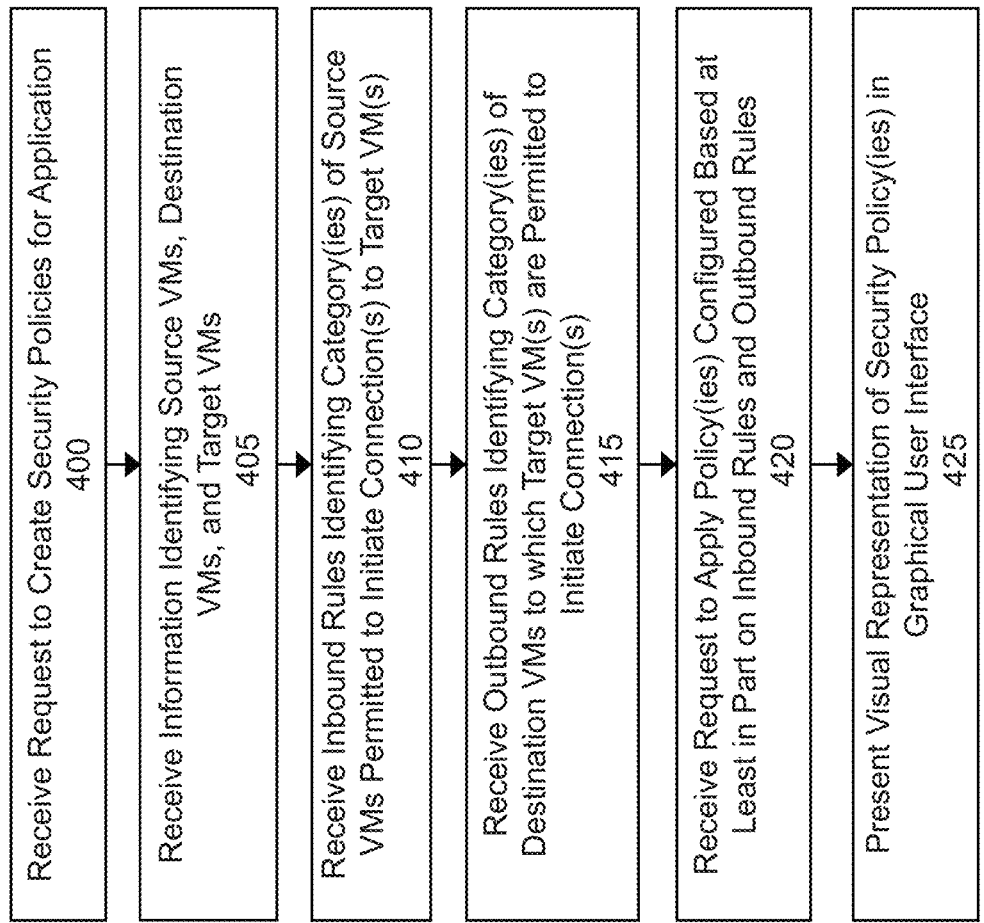

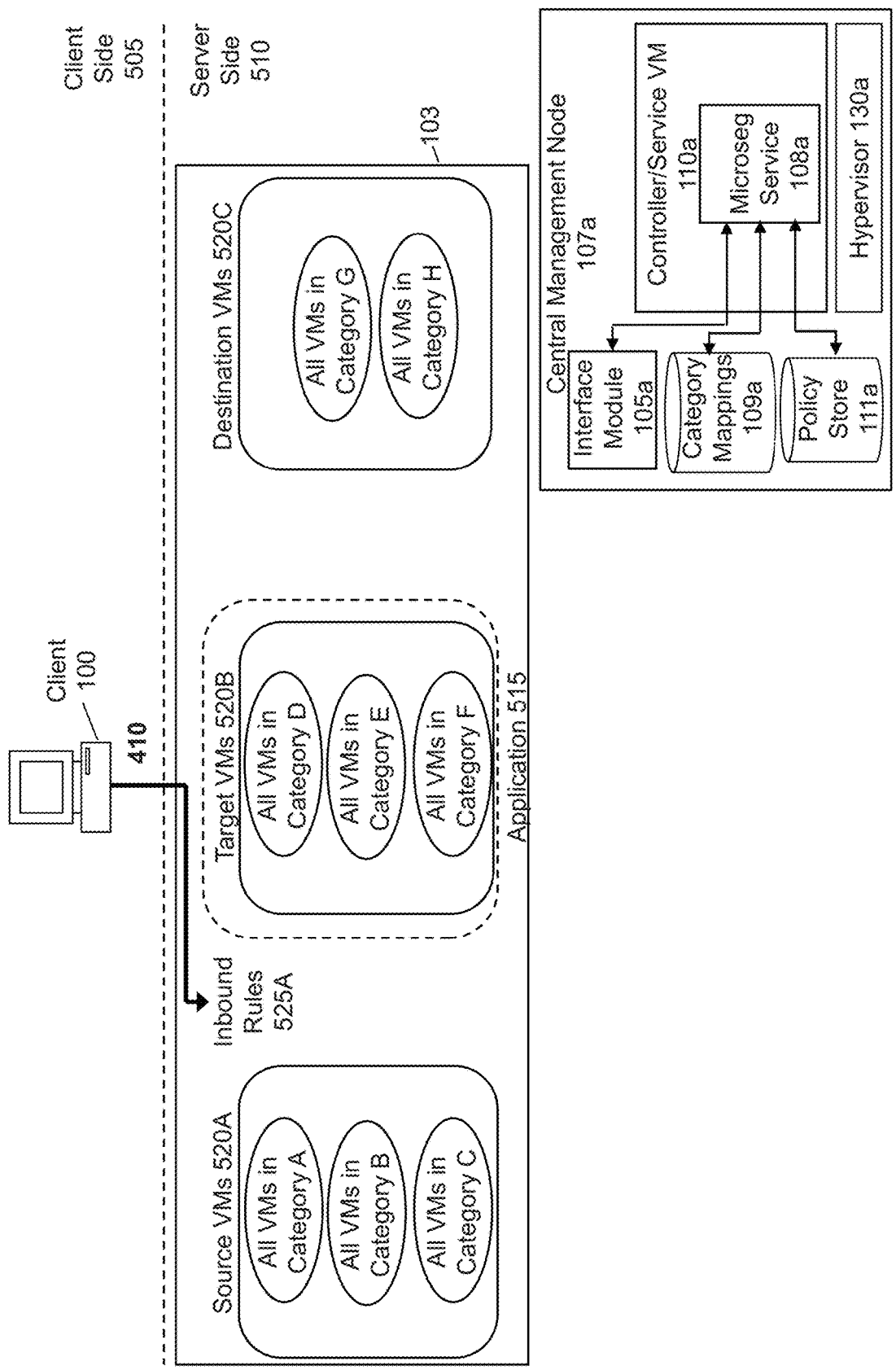

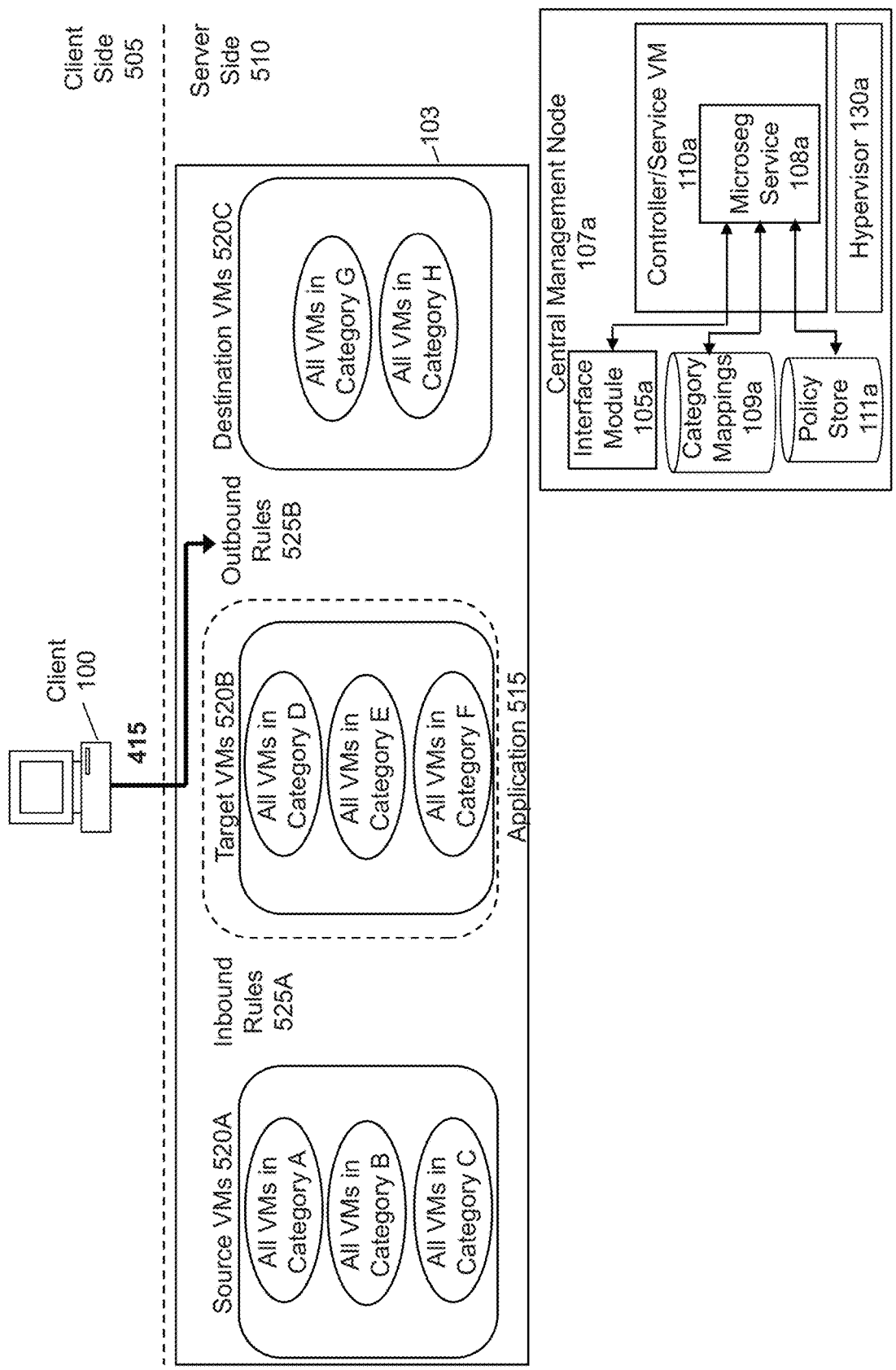

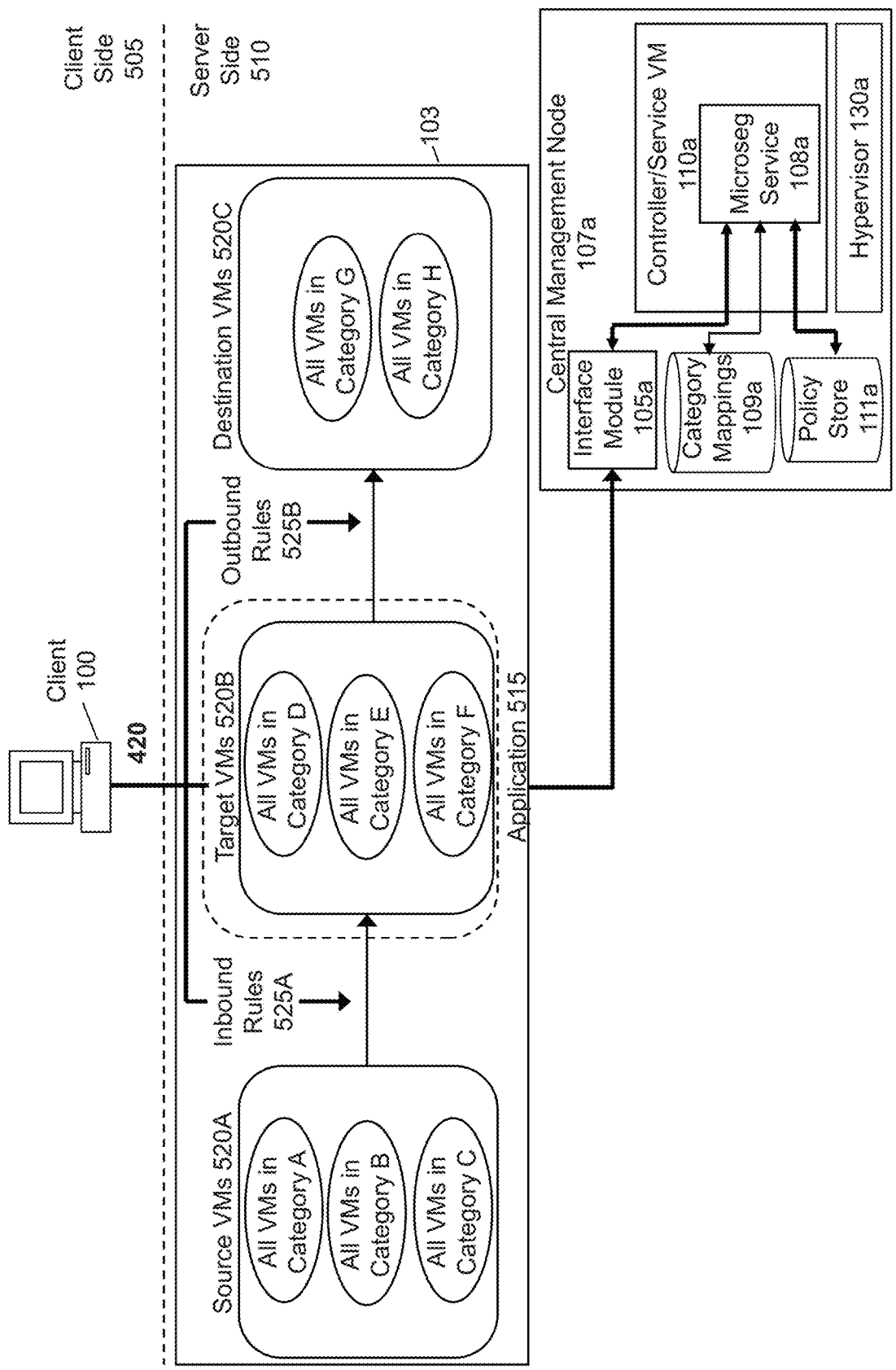

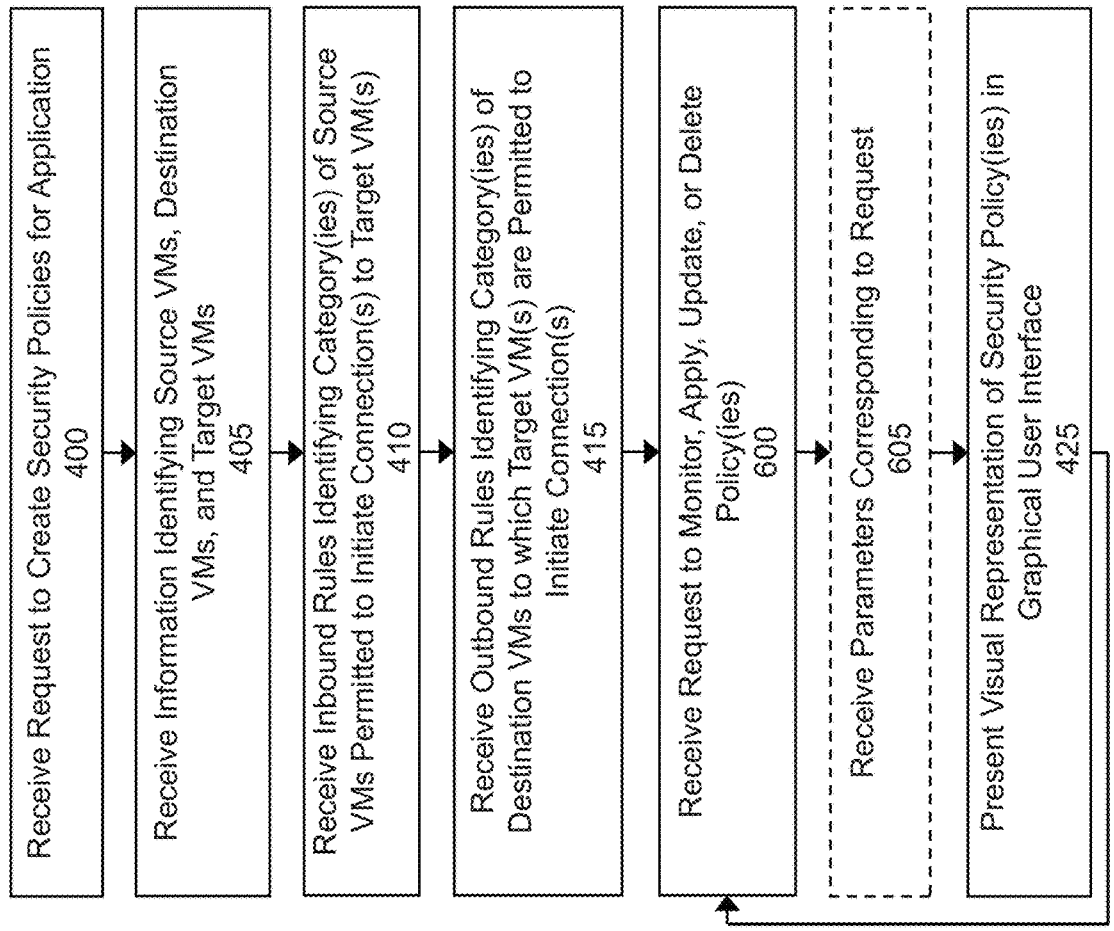

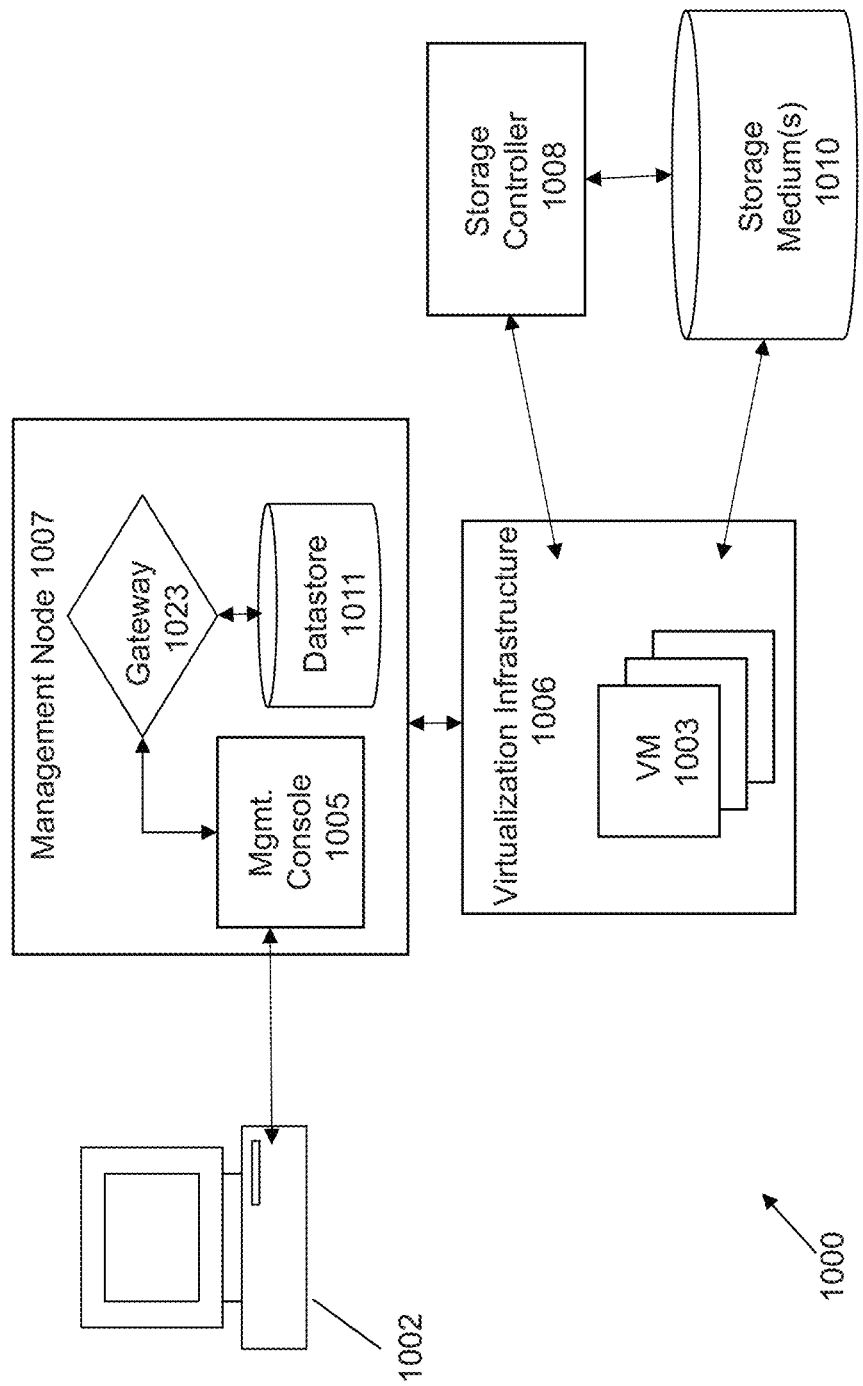

CREATION OF SECURITY POLICIES USING A VISUAL APPROACH

FIELD

This disclosure concerns a visual approach for the creation of security policies.

BACKGROUND

Security policies may define various permissions, limitations, or other constraints with respect to applications executing in virtualized computing systems to prevent internal or external security threats. Traditionally, security policies are enforced through the use of firewalls that are configured on routers, switches, and other network devices. For example, suppose that security policies are to be applied to a particular application, such that only certain employees belonging to specific departments within an enterprise who are authorized to access the application may do so. In this example, routers and switches within a network must be configured to allow only the authorized users to access the application.

However, the process of configuring network devices to apply security policies to applications executing in a virtualized computing system poses several problems. Since several system administrators are often required to work together in order to configure security policies, this process is time-consuming. In the above example, different system administrators are required to perform specialized tasks to enforce the policies—an IT administrator must first install the application, a network administrator must then set up a network to allow all users to access the application, and a security administrator must then configure policies on the switches and routers within the network to restrict access to the application to the authorized employees. Additionally, security policies must be configured manually by providing various parameters (e.g., source IP addresses and ports, destination IP addresses and ports, etc.), making this process even more time-consuming. Also, manual configuration of security policies makes this process error-prone, increasing the vulnerability of applications to security breaches. Furthermore, this process poses a scalability issue, especially as users change (e.g., as employees join or leave an enterprise) and as more policies may have to be managed over time. Moreover, if security policies must be applied to different types of applications that behave differently (e.g., file servers, video conferencing applications, etc.), different types of policy language may be required to define policies to be applied to the applications based on the structure of the applications, further complicating the process. Finally, highly dynamic virtualized environments, such as web-scale applications (e.g., multi-tiered applications that are used in cloud deployments), require dynamic security policies. Therefore, lag time attributable to manual determination and assignment of policies may result in degradation of user experience.

Thus, there is a need for an improved approach for the creation of security policies.

SUMMARY

Embodiments of the present invention provide a method, a computer program product, and a computer system for the creation of security policies using a visual approach.

According to some embodiments, a set of security policies for an application executing in a clustered virtualization environment is created using a graphical user interface. To create the security policies, a request to create the policies is received via the graphical user interface. Information identifying a set of source virtual machines, a set of destination virtual machines, and a set of target virtual machines executing the application is then received at the graphical user interface, in which the set of target virtual machines are supported by one or more nodes in the clustered virtualization environment. A set of inbound rules identifying one or more categories of source virtual machines that are permitted to initiate connections to one or more categories of target virtual machines and a set of outbound rules identifying one or more categories of destination virtual machines to which one or more categories of target virtual machines are permitted to initiate connections also are received via the graphical user interface. Upon receiving a request to apply the set of security policies to the application, the security policies are configured based at least in part on the inbound rules and the outbound rules and a visual representation of the security policies is presented in the graphical user interface.

In some embodiments, categories of virtual machines may be associated with an environment (e.g., production, development, etc.) and/or a location (e.g., a geographic region). Furthermore, in some embodiments, the target virtual machines may be associated with different tiers of an application to which the set of security policies may be applied (e.g., a web tier, an application tier, a database tier, etc.). In such embodiments, the security policies also may be configured based at least in part on a set of rules identifying a subset of the target virtual machines corresponding to a first tier within the application to which another subset of the target virtual machines corresponding to a second tier within the application is permitted to initiate connections or is restricted from initiating connections. In various embodiments, configuration of the security policies also may be based on a whitelist security model, such that connections only may be established between virtual machines belonging to categories that appear in the graphical user interface that were specified by the inbound rules and the outbound rules. In some embodiments, a request may be received at the graphical user interface to update, monitor, and/or delete one or more of the security policies. In such embodiments, parameters corresponding to the request (e.g., updated inbound rules or outbound rules, etc.) also may be received at the graphical user interface and a visual representation of the security policies configured based at least in part on the request may be presented in the graphical user interface. Furthermore, in some embodiments, visual representation of the set of security policies may include information indicating a number of traffic flows that do not match any of the set of security policies and/or information indicating a violation of one or more of the set of security policies.

Further details of aspects, objects and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 3A illustrates an example of a graphical user interface for managing a set of security policies according to some embodiments of the invention.

FIG. 4 illustrates a flowchart for presenting a visual representation of a set of security policies according to some embodiments of the invention.

FIGS. 5A-5F illustrate an example of presenting a visual representation of a set of security policies according to some embodiments of the invention.

FIG. 6 illustrates an alternative flowchart for presenting a visual representation of a set of security policies according to some embodiments of the invention.

FIG. 10 illustrates a system to implement a virtualization management console according to some embodiments of the invention.

DETAILED DESCRIPTION OF THE EMBODIMENTS OF THE INVENTION

The present disclosure provides a visual approach for the creation of security policies.

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

This disclosure will now discuss a visual approach for the creation of security policies. Applications executing in a clustered virtualization environment may be executing on multiple virtual machines ("VMs") supported by one or more nodes (e.g., nodes included in one or more clusters of nodes) in the clustered virtualization environment. To create a set of security policies for an application executing in a clustered virtualization environment, a graphical user interface may receive a request (e.g., from a security admin or other user) to create the set of security policies. Information identifying a set of source VMs, a set of destination VMs, and a set of target VMs executing the application also are received at the graphical user interface, in which the set of target VMs are supported by one or more nodes in the clustered virtualization environment. A set of inbound rules identifying one or more categories of the source VMs that are allowed to initiate connections with a subset of target VMs as well as a set of outbound rules identifying one or more categories of the destination VMs to which the subset of target VMs are allowed to initiate connections also are received at the graphical user interface. Upon receiving a request to apply the set of security policies, the security policies are configured based at least in part on the inbound and outbound rules and a visual representation of the security policies is presented in the graphical user interface.

Figure 1:
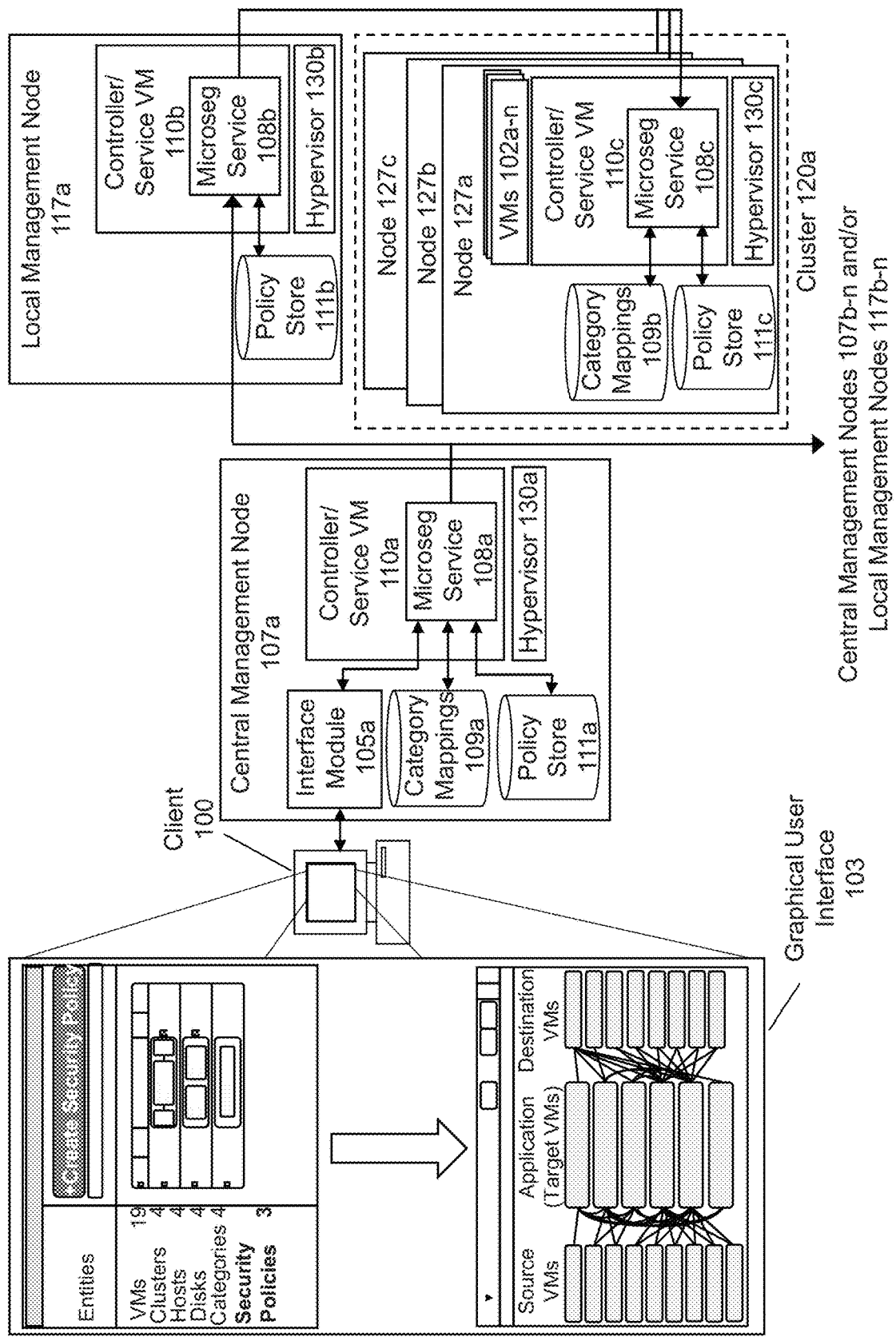
FIG. 1 illustrates a clustered virtualization environment in which some embodiments of the invention are implemented.

For illustrative purposes, FIG. 1 illustrates a clustered virtualization environment in which some embodiments of the invention are implemented. In various embodiments, the clustered virtualization environment may include any number of central management nodes 107 and local management nodes 117 and each cluster 120 managed by a local management node 117 may include more or fewer nodes 127 than depicted in FIG. 1. Additionally, each node 127 may support any number of VMs 102. Furthermore, conventional components of clustered virtualization environments, such as operating systems, API layers, and the like are not shown so as to not obscure the components of the clustered virtualization environment to be discussed with regard to FIG. 1.

A clustered virtualization environment may include multiple nodes 127 (e.g., servers, hyperconverged systems that integrate compute and storage, etc.), in which each node 127 supports one or more VMs 102. A VM 102 refers to a specific software-based implementation of a machine in a clustered virtualization environment, in which the hardware resources of a real computer (e.g., CPU, memory, storage, etc.) are virtualized or transformed into the underlying support for a fully functional VM 102 that can run its own operating system and applications on the underlying physical resources, just like a real computer. Virtualization works by inserting a thin layer of software directly on the computer hardware or on a host operating system. This layer of software contains a VM monitor or "hypervisor" 130 that allocates hardware resources of a node 127 dynamically and transparently. Nodes 127 in the clustered virtualization environment may be grouped into clusters 120 of nodes 127 that are managed by a local management node 117. Furthermore, multiple local management nodes 117 may be managed by a central management node 107.

The central management nodes 107, local management nodes 117, and nodes 127 within one or more clusters 120 within the clustered virtualization environment may include one or more databases (i.e., category mappings 109 and policy store 111). These databases may comprise any combination of physical and logical structures as is ordinarily used for database systems, such as Hard Disk Drives (HDDs), Solid State Drives (SSDs), logical partitions, and the like. As shown in FIG. 1, in some embodiments, the category mappings 109 and/or the policy store 111 may correspond to a distributed database system having multiple separate databases that contain some portion of the category mappings 109 and/or security policies for applications executing in the clustered virtualization environment. In such embodiments, the databases may be located in different physical locations and some of the databases may be accessible via a remote server. In other embodiments, the category mappings 109 and/or the policy store 111 may correspond to databases located in a storage pool (described below in conjunction with FIGS. 9A and 9B) that may be accessed by the central management nodes 107, the local management nodes 117, and/or nodes 127 within one or more clusters 120 within the clustered virtualization environment.

Figure 2:
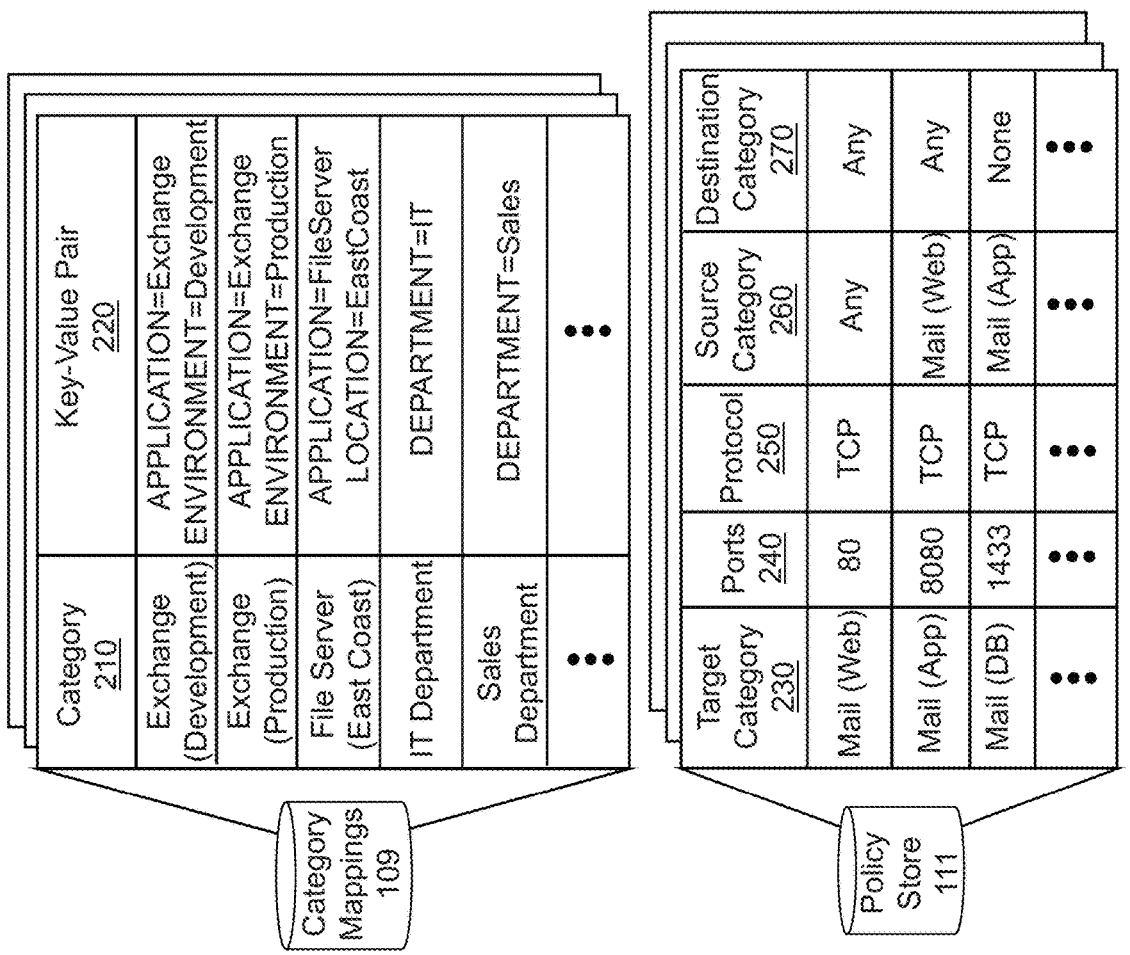
FIG. 2 illustrates examples of category mappings for virtual machines and examples of security policies according to some embodiments of the invention.

FIG. 2 illustrates examples of category mappings for virtual machines according to some embodiments of the invention. As shown in FIG. 2, information stored in the category mappings 109 may include one or more tables that map one or more categories 210 to one or more VMs in the clustered virtualization environment based on key-value pairs 220 associated with the VMs. In some embodiments, a key-value pair 220 may be placed on a VM or on a virtual network interface card (vNIC) associated with each VM. For example, as shown in FIG. 2, a category 210 of VMs associated with an exchange application and a development environment may have the key-value pairs 220 "APPLICATION=Exchange" and "ENVIRONMENT=Development." Key-value pairs 220 may be specified for different applications, environments, locations, departments, or any other suitable category or subcategory that may be associated with a VM. In some embodiments, the key-value pairs 220 placed on a VM or on a vNIC may be automatically assigned to a VM (e.g., based on the application(s) being executed by the VM and the environment(s) in which the applications are being executed). Although not depicted in FIG. 2, categories 210 may be mapped to VMs based on other types of information that may be associated with VMs, such as IP addresses or subnets. For example, suppose that there are applications and infrastructure services, such as Active Directory (AD) or Domain Name System (DNS), running on an infrastructure outside of the clustered virtualization system. In this example, to control access to these applications and services by applications executing in the clustered virtualization system, a category 210 of VMs may be defined based on the key-value pair "key=AD/DNS server; value=10.10.10.10."

In some embodiments, information stored in the category mappings 109 located in the central management nodes 107, the local management nodes 117, and the nodes 127 in clusters 120 within the clustered virtualization environment is identical. For example, referring back to FIG. 1, information stored in category mappings 109a at central management node 107a may be replicated to category mappings 109b at node 127a of cluster 120a. In other embodiments, the information stored in the category mappings 109 located in the central management nodes 107, the local management nodes 117, and the nodes 127 in the clusters 120 may be different. In such embodiments, the category mappings 109 may store different subsets of information mapping categories to VMs based on whether the VMs are managed by a node at which the category mappings 109 are stored. In the above example, information stored in category mappings 109b at node 127a may only include information mapping VMs 102a-n supported by node 127a to various categories. Continuing with this example, information stored in category mappings 109a at central management node 107a may include only information mapping VMs 102 managed by the central management node 107a to various categories (e.g., VMs 102 supported by nodes 127 included in clusters 120 managed by local management nodes 117b-n).

FIG. 2 also illustrates examples of security policies according to some embodiments of the invention. As shown in FIG. 2, information stored in the policy store 111 may include one or more tables of security policies for one or more applications executing in a clustered virtualization environment. Each table may describe categories of target VMs 230 to which categories of source VMs 260 may establish connections, ports 240 which may be used to establish connections to the categories of target VMs 230, the protocols 250 that may be used, and categories of destination VMs 270 to which connections may be established by the categories of target VMs 230. In some embodiments, the policy store 111 may include a set of default security policies. Examples of default security policies include a security policy that denies all inbound traffic to a category of target VMs 230 (e.g., in an explicit white-list model), a security policy that allows all outbound traffic from a category of target VMs 230, and a security policy that allows all internal traffic between target VMs of the same category. In embodiments in which the policy store 111 includes a set of default security policies, one or more of the default security policies may be disabled (e.g., by a system administrator).

In some embodiments, security policies stored in the policy store 111 may include security policies for multi-tiered applications. For example, as shown in FIG. 2, suppose that a mail application includes three tiers (i.e., a web tier, an application tier, and a database tier), in which all three tiers may be in the same subnet or in different subnets in a clustered virtualization environment. In this example, to allow web servers for the mail application to be accessed from the Internet, connections may be established by any category of source VMs 260 to the category of target VMs 230 corresponding to the web tier of the mail application via port 80 using the TCP protocol. Furthermore, the value in the category of destination VMs 270 indicates that all outbound traffic from the web tier is allowed. Similarly, as shown in FIG. 2, the application tier of the mail application only accepts connections from the web tier via port 8080 using the TCP protocol and all outbound traffic from the application tier is allowed. The table also shows that the database tier of the mail application only accepts connections from the application tier via port 1433 using the TCP protocol and the value in the category of destination VMs 270 indicates that the database tier is not allowed to initiate connections to any category of VMs.

Although not depicted in FIG. 2, in various embodiments, information stored in the policy store 111 may include additional information associated with each policy, such as a deployment mode (e.g., monitor or apply, as further described below), an expiration date/time associated with the policy, a policy type, a scope of the policy (as further described below), etc. An example of a policy type includes quarantine policies to quarantine specific VMs, such as VMs that pose a security threat to applications executing in the clustered virtualization environment (e.g., unidentified source VMs that are trying to initiate connections with an application executing in the clustered virtualization environment). Other examples of policy types include environment isolation policies that isolate VMs executing in different environments, application reference policies that are specific to an instance of an application, application policies that identify types of traffic that are allowed, etc. In embodiments in which information stored in the policy store 111 includes information describing various policy types, different policies may have different priorities, such that policies having higher priorities override policies having lower priorities. For example, quarantine policies may have the highest priority, followed by environment isolation policies, followed by application reference policies, followed by application policies, such that quarantine policies override all other security policies, environment isolation policies override all security policies except quarantine policies, etc.

In embodiments in which the category mappings 109 map categories 210 to VMs based at least in part on key-value pairs 220, security policies stored in the policy store 111 may be associated with additional scope that is defined based on pre-defined keys corresponding to the key-value pairs 220 (e.g., LOCATION, APPLICATION, ENVIRONMENT, etc.). The scope associated with a set of security policies restricts the applicability of the security policies to a defined boundary (e.g., an application, environment, location, etc.). For example, if there are multiple applications executing in the same environment, to allow all VMs executing the same application to communicate with each other while isolating each application from other applications, an application scope may be applied. As an additional example, if there are multiple applications executing in a single virtual network, to allow all applications executing in the virtual network to communicate with each other while isolating the virtual network from the outside world, a virtual network scope may be used.

The information stored in the category mappings 109 and in the policy store 111 allow categories 210 of VMs and policies associated with the categories 210 to be managed. By updating the category mappings 109 when categories 210 are added, deleted, or updated, existing policies stored in the policy store 111 may be automatically applied to, removed from, or modified for VMs belonging to the associated categories 210. Similarly, when VM membership in a category 210 changes, policies associated with the category 210 may be automatically applied to the VMs in the category 210 and/or automatically removed from the VMs no longer included in the category 210. Furthermore, by updating the information stored in the policy store 111 when a policy is added, deleted, or updated, new or updated policies may be automatically applied to the associated categories 210 of VMs and deleted policies may be automatically removed from the categories 210 of VMs.

Referring back to FIG. 1, the central management nodes 107, local management nodes 117, and nodes 127 within one or more clusters 120 in the clustered virtualization environment also may include a hypervisor 130 and a Controller/Service VM 110, which is a special VM that is used to manage storage and I/O activities and which runs as a VM above the hypervisor 130, as further described below in conjunction with FIGS. 9A and 9B. A Microsegmentation Service ("Microseg Service") 108, which implements a microsegmentation policy model that is used in the establishment of connections between VMs 102 in the clustered virtualization environment, runs on the Controller/Service VM 110. The microsegmentation policy model determines whether applications executing in the clustered virtualization environment may communicate with each other and/or whether different tiers within each application may communicate with each other. The microsegmentation policy model is independent of network abstractions (e.g., VLANs, IP addresses, MAC addresses, etc.) within the clustered virtualization environment and may be based on applications executing in the clustered virtualization environment and/or on VMs 102 executing the applications through the use of categories, as further described below.

The Microseg Service 108 is used to configure and implement security policies for applications executing in the clustered virtualization environment. To do so, the Microseg Service 108 in different nodes 107, 117, 127 may communicate with each other and communicate with and/or access components of each of the respective nodes (e.g., the interface module 105, the category mappings 109, and/or the policy store 111). For example, suppose that Microseg Service 108a running in central management node 107a receives inputs describing an update to an existing security policy from a client 100 (e.g., a management console) via a graphical user interface 103 presented by interface module 105a of central management node 107a. In this example, suppose also that the security policy being updated is associated with categories of VMs 102a-n supported by node 127a. Continuing with this example, based on the inputs received via the graphical user interface 103, Microseg Service 108a may access policy store 111a to update the existing security policy based on the inputs and communicate information describing the update to Microseg Service 108b running in local management node 117a. In this example, Microseg Service 108b may access policy store 111b to update the existing security policy based on the inputs and communicate the information describing the update to Microseg Service 108c running in node 127a, which is included in the cluster 120a managed by local management node 117a. In the above example, Microseg Service 108c may access policy store 111c to update the existing security policy based on the inputs. A similar cascade of events may occur when Microseg Service 108a communicates the information describing the update to the Microseg Service 108 running in central management nodes 107b-n. This allows the Microseg Service 108 in different nodes 107, 117, 127 to communicate and coordinate with each other to update the security policy so that it may be applied. Other types of changes to the security policies, changes to the category mappings 109, and/or changes to VM membership in a category may be handled in an analogous manner.

To implement a set of security policies for an application executing in the clustered virtualization environment, a request to create the policies may be received from a client 100 via the graphical user interface 103. As described above, information identifying a set of source VMs 102, a set of destination VMs 102, and a set of target VMs 102 executing the application also may be received via the graphical user interface 103 and communicated to the Microseg Service 108 (e.g., Microseg Service 108a of central management node 107a). In some embodiments, information identifying the set of target VMs 102 may include information identifying one or more categories of target VMs 102. For example, after receiving a request to create a set of security policies for an application via a graphical user interface 103, information identifying the application is received via the graphical user interface 103 and forwarded from interface module 105a to Microseg Service 108a at central management node 107a. In this example, Microseg Service 108a identifies one or more target VMs 102 executing the application by accessing category mappings 109a and identifying one or more categories of target VMs having key-value pairs associated with the specified application.

A set of inbound rules identifying one or more categories of the source VMs 102 that are allowed to initiate connections with a subset of target VMs 102 as well as a set of outbound rules identifying a set of categories of the destination VMs 102 to which the subset of target VMs are allowed to initiate connections are also received via the graphical user interface 103. Upon receiving a request via the graphical user interface 103 to apply the set of security policies, the security policies are configured based at least in part on the inbound and outbound rules and a visual representation of the security policies is presented in the graphical user interface 103. In some embodiments, the security policies may be stored at the policy store 111 (e.g., by the Microseg Service 108, as described above). Further details regarding methods and mechanisms for implementing the security policies illustrated in FIG. 1 are described in U.S. Provisional Application No. 62/588,880, filed on Nov. 20, 2017, titled "POLICY AGGREGATION," which is hereby incorporated by reference in its entirety.

FIG. 3A illustrates a graphical user interface for managing a set of security policies according to some embodiments of the invention. In various embodiments, the graphical user interface may include more or fewer elements than depicted in FIG. 3A. Furthermore, in some embodiments, the elements included in the graphical user interface (e.g., interactive elements, text, icons, images, etc.), formats, or arrangements of the elements may be different from those illustrated in FIG. 3A. Moreover, in various embodiments, the graphical user interface may include more or fewer security policies than depicted in FIG. 3A and the types of security policies and categories of VMs associated with each type of security policy may differ from those depicted in FIG. 3A.

As shown in FIG. 3A, the graphical user interface 103 may include information that describes entities 302 included in the clustered virtualization environment (e.g., VMs, clusters, hosts, disks, categories, and security policies) and the number of each type of entity. Upon selection of an entity 302, the graphical user interface may be updated to include various interactive elements (e.g., buttons, drop-down menus, text fields, scroll bars, etc.) that allow the selected entity 302 to be managed. For example, by clicking on a button corresponding to the "VMs" entity, information describing categories to which each VM belongs and interactive elements allowing the categories to be changed may be presented in the graphical user interface 103. As an additional example, as shown in FIG. 3A, upon selection of the security policies entity (as indicated by the bolded text in 302), the security policies may be managed by interacting with a button 304 that allows the creation of a new security policy to be requested and a text field 306 that may receive search terms used to search for an existing security policy. Other interactive elements 308 included in the graphical user interface 103 may allow the visual representation of the existing security policies (presented in table 320) to be changed (e.g., by sorting or filtering the security policies based on one or more parameters, by organizing the security policies as icons, in a list, in columns, etc.). Although not illustrated in FIG. 3A, in some embodiments, the graphical user interface 103 may be updated to include information based on inputs received via the graphical user interface 103. In some embodiments, the graphical user interface 103 may be updated to include information that indicates the effect of any changes that potentially may be made to the entities. For example, if a request to change a category associated with a VM is received at the graphical user interface 103, the graphical user interface 103 may be updated to include text that explains how the security policies applied to the VM may be affected by the change.

As mentioned above, information describing the existing security policies may be presented in a table 320. In the event that there are more existing security policies than may be displayed in the table 320, the graphical user interface 103 may include an interactive element 310 (e.g., a button or a scroll bar) that allows information describing additional security policies to be displayed in the table 320. The table 320 may have multiple columns indicating various attributes associated with each security policy (e.g., a name 322, a purpose 324, a policy type 326, a status 328, and a last modified date 330). The table 320 also may have multiple rows 340, in which each row corresponds to an existing security policy. For example, the first row of the security policies shown in table 320 has the name 322 "Exchange Security," and has a purpose 324 of securing the exchange application. Continuing with this example, the policy type 326 for this security policy is one in which four categories of source VMs may initiate connections with target VMs in a category corresponding to an exchange application type in a production environment and in which the target VMs may initiate connections with one category of destination VMs. Furthermore, in this example, the status 328 of this security policy indicates that it has been applied and the value in the last modified column 330 indicates that it was last modified on Jan. 2, 2017 at 11:34:23 am.

Similar information is included in the other rows of the table 320 shown in FIG. 3A. The information in the second row of the table 320 indicates that the corresponding security policy has the name 322 "New Isolation Policy" and the purpose 324 of isolating production and development environments. The policy type 326 of this security policy indicates that the policy isolates the production environment in the HR department from the development environment in the HR department, while the current status 328 indicates that the policy is being monitored (i.e., not applied), and the value in the last modified column 330 indicates that it was most recently modified a few seconds ago. Finally, information in the third row of the table 320 indicates that the corresponding security policy has the name 322 "Quarantine (Default)" (indicating that this security policy is a default security policy) and has the purpose 324 of isolating security threats. The policy type 326 indicates that there are currently no VMs that have been quarantined. Furthermore, this policy has a current status 328 of being applied, and was last modified 330 on Jan. 2, 2017 at 11:34:23 am. As described above, in various embodiments, the graphical user interface 103 may include more or fewer elements than depicted in FIG. 3A. For example, in the examples described above, the last modified column 330 may indicate which user last modified each policy. As an additional example, the table 320 in the above examples may include additional columns (e.g., a column indicating a date and time that each policy was created).

In some embodiments, the graphical user interface 103 may include icons or other elements that indicate that an event associated with a policy may require attention. Examples of such events include blocked traffic flows, attempts by one or more source VMs to communicate with applications that security policies do not allow for, attempts by applications to communicate with destination VMs that security policies do not allow for, etc. For example, the icons in the status column 328 for the first and second rows of table 320 in FIG. 3A may indicate that such an event has occurred. More detailed information about a given security policy may be presented in the graphical user interface 103 upon selection of the security policy (e.g., by selecting a radio button corresponding to the security policy), as shown in FIG. 3B.

Figure 3B:
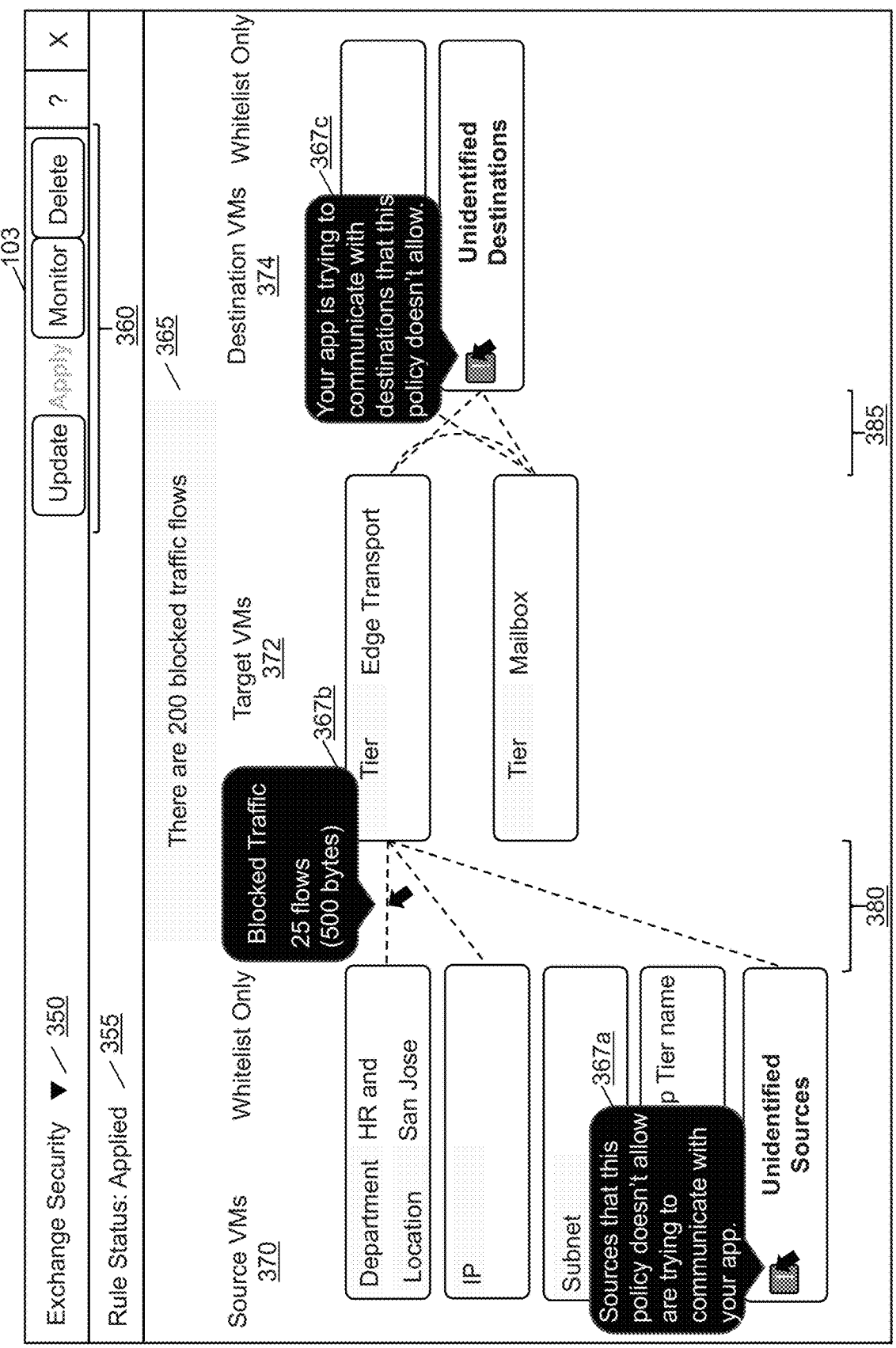
FIGS. 3B-3D illustrate examples of a graphical user interface that includes a visual representation of a set of security policies according to some embodiments of the invention.

As illustrated in FIG. 3B, upon receiving a selection of a security policy presented in the graphical user interface 103, more detailed information about the selected policy may be presented in the graphical user interface 103. Information in the upper left-hand portion of the graphical user interface 103 shown in FIG. 3B indicates that the Exchange Security policy 350 has been applied 355. A summary of information associated with the selected security policy also may be presented in the graphical user interface 103 (e.g., "There are 200 blocked traffic flows" 365). In some embodiments, the graphical user interface 103 may include an interactive element (e.g., a down arrow button 350) that allows a different existing security policy to be selected and a visual representation of the corresponding security policy to be presented in the graphical user interface 103. Furthermore, items shown in the left-hand side of the graphical user interface 103 represent categories of source VMs 370, items shown in the middle of the graphical user interface 130 represent categories of target VMs 372, and items shown in the right-hand side of the graphical user interface 130 represent categories of destination VMs 374. As illustrated by the items representing the categories of target VMs 372, the Exchange Security application includes multiple tiers (i.e., Edge Transport and Mailbox).

In some embodiments, the dotted lines 380, 385 represent potential traffic flows between categories of VMs. By hovering over an item corresponding to a category of VMs or a potential traffic flow 380, 385, more detailed information about the VMs or potential traffic flow 380, 385 may be presented in the graphical user interface 103. For example, by hovering over an icon included in an item corresponding to unidentified source VMs 370, information presented in the graphical user interface 103 indicates that sources that the Exchange Security policy does not allow are trying to communicate with the application 367a. Furthermore, in this example, the dotted line 380 between the item corresponding to unidentified source VMs 370 and the item corresponding to the Edge Transport tier of the Exchange application, indicates that the unidentified source VMs 370 are attempting to communicate with a category of target VMs 372 corresponding to the Edge Transport tier of the Exchange application. As an additional example, by hovering over the potential traffic flow 380 between the first category of source VMs 370 and the first category of target VMs 372, information presented in the graphical user interface 103 indicates that there are 25 flows or 500 bytes of blocked traffic 367b. As yet another example, by hovering over an icon included in an item corresponding to unidentified destination VMs 374, information presented in the graphical user interface 103 indicates that the application is trying to communicate with destinations VMs that the Exchange Security policy does not allow 367c.

Figure 3C:
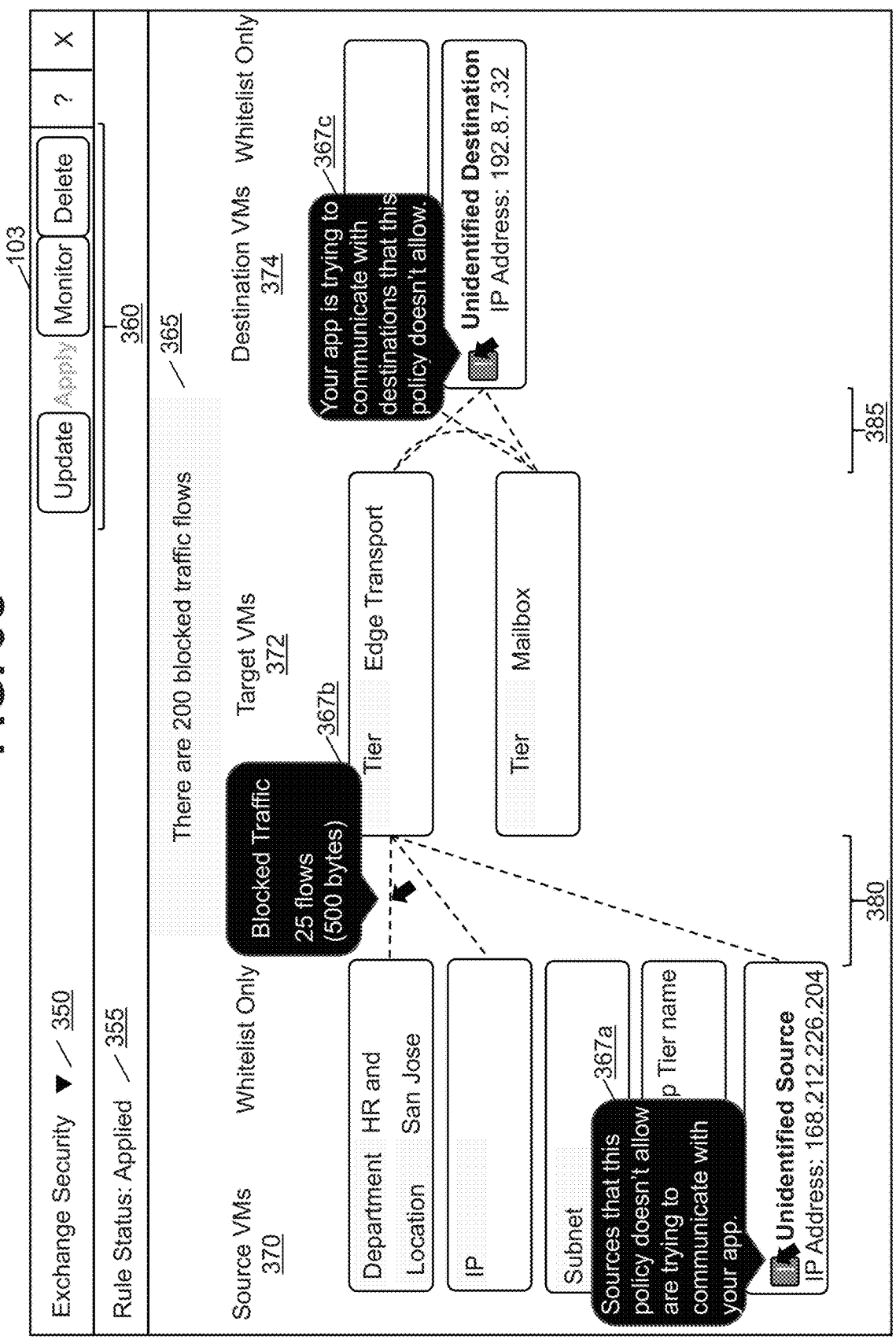

Although not depicted in FIG. 3B, in some embodiments, the information presented in the graphical user interface 103 also may include information describing the unidentified source VMs 370 and/or the unidentified destination VMs 374 (e.g., their IP addresses). In some embodiments, this information may be displayed in the items corresponding to unidentified source VMs 370 and/or the unidentified destination VMs 374. Alternatively, this information may be presented in a separate window that is presented when interacting with or hovering over an icon corresponding to unidentified source VMs 370 and the unidentified destination VMs 374. In some embodiments, the graphical user interface 103 may include multiple items corresponding to unidentified source VMs 370 and/or unidentified destination VMs 374. In such embodiments, each item may be labeled with information indicating that the VMs are unidentified as well as information that uniquely identifies the VMs (e.g., an IP address associated with each VM). For example, as shown in FIG. 3C, each unidentified source VM 370 and each unidentified destination VM 374 is represented by an item in the graphical user interface 103 and includes a label identifying each VM as unidentified source VM 370 or an unidentified destination VM 374. The label for each item also includes the IP address associated with each unidentified VM.

In various embodiments, potential traffic flows 380, 385 may be blocked if connections between categories of VMs are not permitted. In some embodiments, a connection between a pair of categories of VMs may only be initiated by one of the categories of VMs. For example, categories of source VMs 370 may be capable of initiating connections with categories of target VMs 372 and categories of target VMs 372 may be capable of initiating connections with categories of destination VMs 374, but categories of target VMs 372 may not be capable of initiating connections with categories of source VMs 370 and categories of destination VMs 374 may not be capable of initiating connections with categories of target VMs 372.

In some embodiments, categories of source VMs 370, target VMs 372, destination VMs 374, and/or security policies may be monitored, updated, or deleted via the graphical user interface 103. In some embodiments, a request to monitor, update, or delete a category of VMs or a security policy may be received via an interactive element 360 along with information indicating the corresponding category/policy to be monitored, updated, or deleted. For example, the categories of source VMs 370 may be updated to include the unidentified source VMs shown in FIG. 3B if a system administrator clicks on the update button 360 and communicates instructions to add the unidentified source VMs to the categories of source VMs 370. Monitoring, updating, and deleting security policies is further described below in conjunction with FIG. 6

Figure 3D:
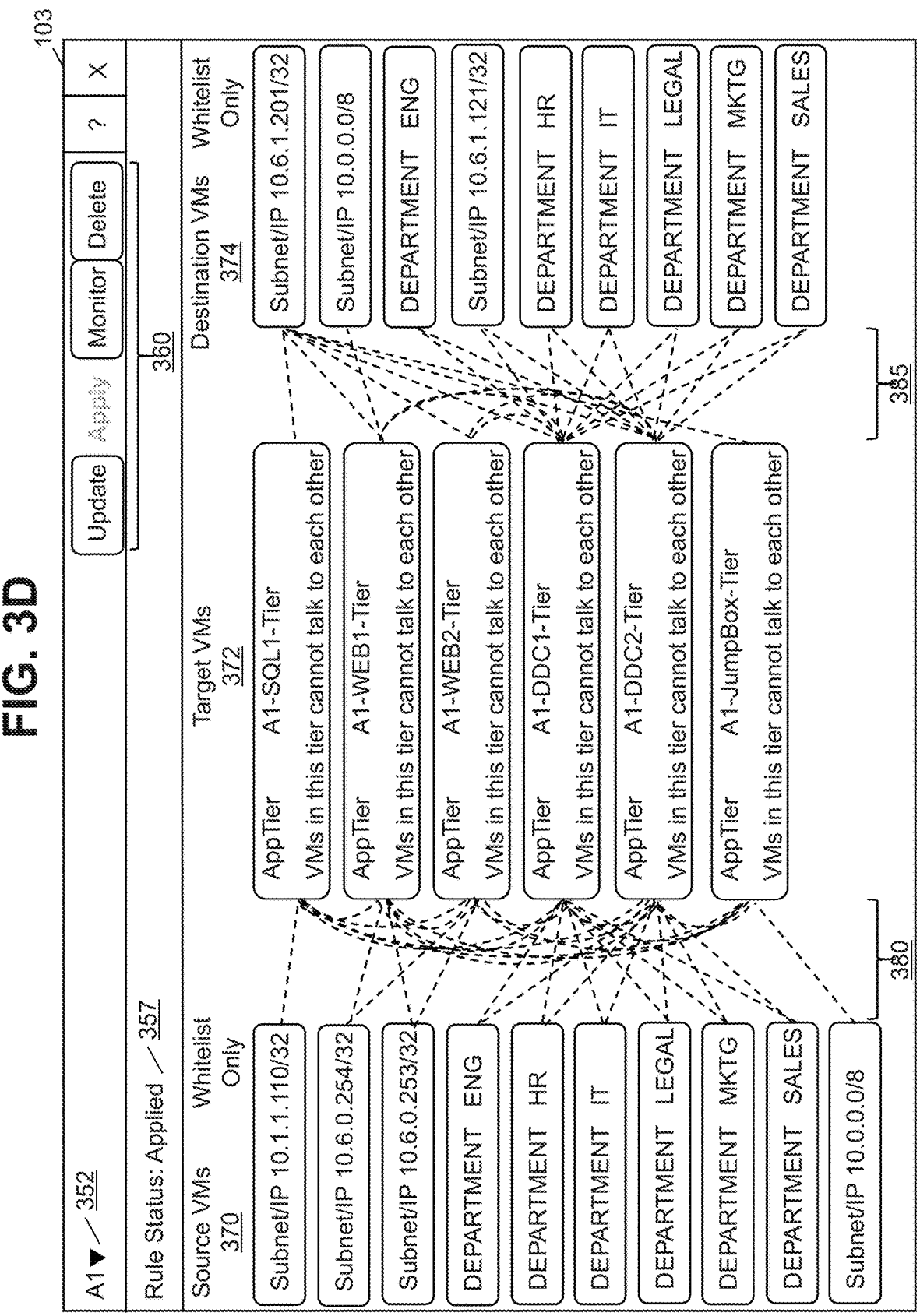

Similar to FIGS. 3B and 3C, FIG. 3D illustrates an example of a graphical user interface that includes a visual representation of a set of security policies according to some embodiments of the invention. As mentioned above, the text included in the upper left-hand portion of the graphical user interface 103 illustrated in FIG. 3D indicates that a set of security policies have been created for an application "A1" 352 that have been applied 357 to this application. The graphical user interface 103 also may include the interactive elements 360 that allow the status of the existing security policies to be monitored, updated, or deleted. As shown by the items representing the categories of target VMs 372, application A1 includes multiple tiers (e.g., SQL1, SQL2, WEB1, WEB2, DDC1, DDC2, and JumpBox). Furthermore, although the text in each of the items representing the categories of target VMs 372 indicates that the target VMs in each tier are not capable of communicating with each other, in some embodiments, the policies may be configured such that the VMs in each of these tiers are capable of doing so. Additionally, since the graphical user interface 103 indicates that communications among the categories of source VMs 370, the categories of target VMs 372, and the categories of destination VMs 374 are based on a whitelist model, connections only may be established between the categories listed in the graphical user interface 103 that were specified by the inbound rules and outbound rules on which configuration of the security policies were based.

Similar to FIGS. 3B and 3C, the dotted lines 380, 385 provide a visual representation of potential traffic flows between categories of VMs. For example, the dotted line 380 between the category of source VMs 370 labeled "Subnet/IP 10.1.1.110/32" and the category of target VMs 372 labeled "A1-SQL1-Tier" corresponds to a potential traffic flow between the categories of VMs. The lack of dotted lines 380 between the category of source VMs 370 labeled "Subnet/IP 10.1.1.110/32" and other categories of target VMs 372 indicates that there are no potential traffic flows between this category of source VMs 370 and other categories of target VMs 372. As an additional example, the dotted lines 385 between each of the categories of target VMs 372 and the category of destination VMs 374 labeled "Subnet/IP 10.6.1.201/32" indicates potential traffic flows between these categories of target VMs 372 and VMs corresponding to the category of Subnet/IP 10.6.1.201/32, but the lack of dotted lines 385 between the category of target VMs 372 labeled "A1-SQL1-Tier" and other categories of destination VMs 374 indicates that there are no potential traffic flows between this category of target VMs 372 and VMs corresponding to other categories of destination VMs 374. In some embodiments, lack of potential traffic flows may be due to security policies prohibiting such traffic flows.

FIG. 4 is a flowchart for presenting a visual representation of a set of security policies according to some embodiments of the invention. Some of the steps illustrated in the flowchart are optional in different embodiments. In some embodiments, the steps may be performed in an order different from that described in FIG. 4.

Figure 5A:
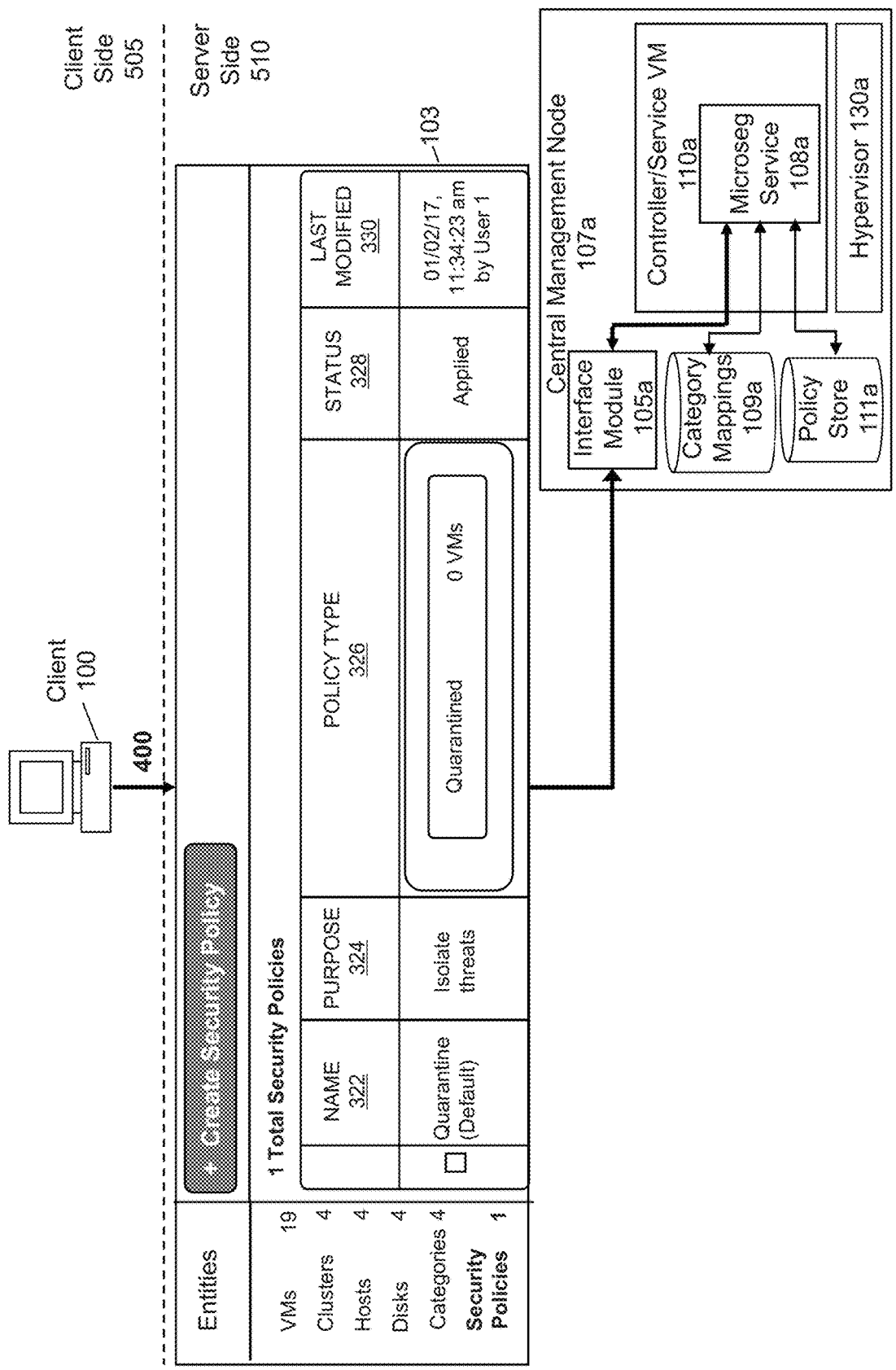
Figure 5B:
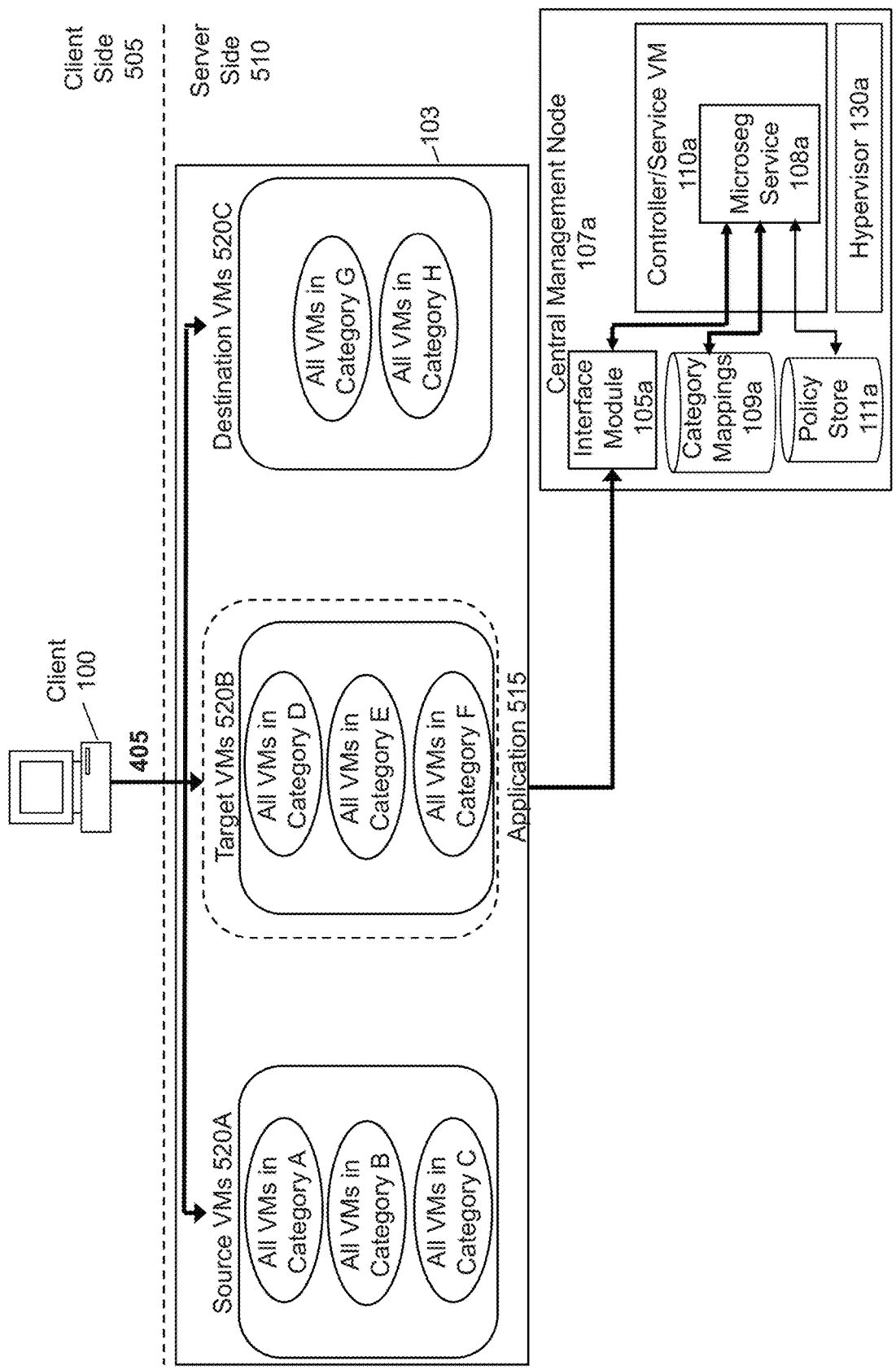

As shown in FIG. 4, the flowchart begins when a request to create a set of security policies for an application executing in a clustered virtualization environment is received via a graphical user interface (in step 400). Then, information identifying a set of source VMs, a set of destination VMs, and a set of target VMs is received via the graphical user interface (in step 405). In some embodiments, the application is executing on the set of target VMs supported by one or more nodes in the clustered virtualization environment. For example, as shown in FIG. 5A, in a client-server system, a request to create a set of security policies for an application from a client 100 in the client side 505 is received at the server side 510 at a user interface 103. This request may be communicated via the interface module 105a of the central management node 107a to the Microseg Service 108a as shown in FIG. 5A and described above in conjunction with FIG. 1. Then, as shown in FIG. 5B, which continues the example of FIG. 5A, information identifying a set of source VMs 520A, a set of destination VMs 520C, and a set of target VMs 520B executing the application 515, is also received from the client 100.

In some embodiments, the source VMs 520A, target VMs 520B, and destination VMs 520C may be identified based at least in part on one or more categories to which the VMs belong. For example, as shown in FIG. 5B, the source VMs 520A may be identified as all VMs belonging to Category A, Category B, and Category C, the target VMs 520B may be identified as all VMs belonging to Category D, Category E, and Category F, and the destination VMs 520C may be identified as all VMs belonging to Category G and Category H. The categories corresponding to the VMs may be included in the category mappings 109a of the central management node 107a described above in conjunction with FIGS. 1 and 2. Furthermore, as described above in conjunction with FIG. 1, in some embodiments, rather than receiving information describing the target VMs 520B from the client 100, information identifying the application 515 is received via the graphical user interface 103 and forwarded from interface module 105a to Microseg Service 108a at central management node 107a. In such embodiments, Microseg Service 108a identifies one or more target VMs executing the application 515 by accessing category mappings 109a and identifying one or more categories of target VMs having key-value pairs associated with the specified application 515.

Referring back to FIG. 4, a set of inbound rules identifying one or more categories of the set of source VMs that are permitted to initiate connections to a subset of the target VMs and a set of outbound rules identifying one or more additional categories of the set of destination VMs to which the subset of the target VMs are permitted to initiate connections also may be received at the graphical user interface (in steps 410 and 415, respectively). For example, as shown in FIG. 5C, which continues the example discussed above with respect to FIGS. 5A-5B, a set of inbound rules 525A describing one or more categories of source VMs 520A that are permitted to initiate connections with one or more categories of target VMs 520B is received via the graphical user interface 103. Similarly, as shown in the example of FIG. 5D, which continues the example discussed above with respect to FIGS. 5A-5C, a set of outbound rules 525B describing one or more categories of target VMs 520B that are permitted to initiate connections with one or more categories of the destination VMs 520C is received via the graphical user interface 103. In some embodiments, the inbound and outbound rules 525 are "allow only" rules (i.e., there are no deny actions in the policy model), which simplifies policy writing and policy management. Furthermore, in some embodiments, the inbound and outbound rules 525 may be specified in logical and abstracted language that does not require the use of networking constructs (e.g., VLANs, subsets, etc.). For example, an inbound or outbound rule 525 may be written as "Web Tier of App 1 is allowed to communicate with App Tier of App 1."

Figure 5F:
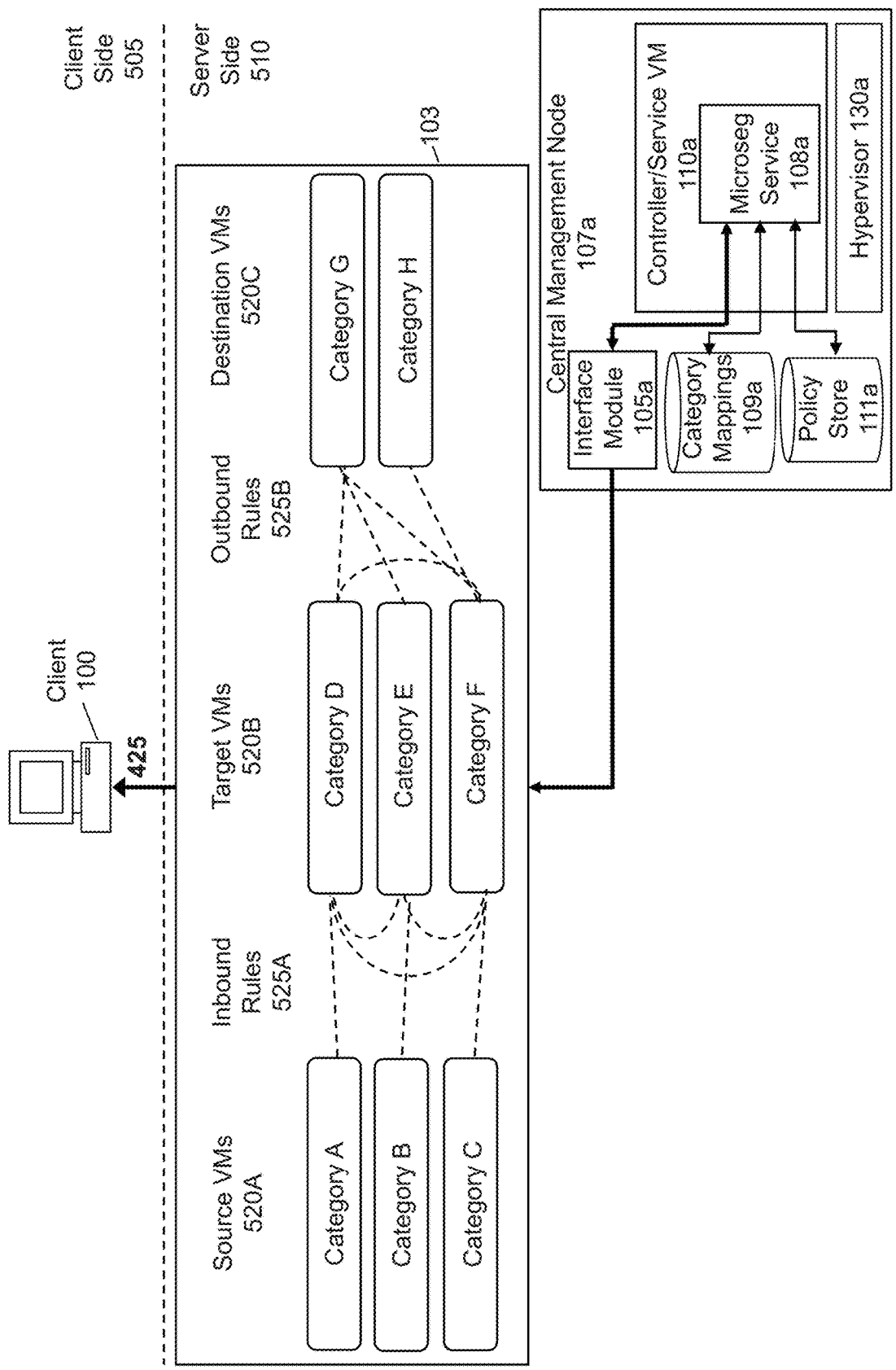

Referring once more to FIG. 4, in response to receiving a request to apply the set of security policies to the application via the graphical user interface (in step 420), a visual representation of the set of security policies is presented in the graphical user interface (in step 425), in which the set of security policies have been configured based at least in part on the set of inbound rules and the set of outbound rules. For example, as shown in FIG. 5E, which continues the example discussed above with respect to FIGS. 5A-5D, a request to apply the inbound rules 525A and the outbound rules 525B is received at the graphical user interface 103 and forwarded to Microseg Service 108a via the interface module 105a. In some embodiments, once the request to apply the set of security policies is received, the policies may be stored (e.g., in the policy store 111 discussed above with respect to FIGS. 1 and 2). Then as shown in FIG. 5F, which continues the example discussed above with respect to FIGS. 5A-4E, a visual representation of the set of security policies is generated by interface module 105a and presented in the graphical user interface 103, in which the set of security policies have been configured based at least in part on the set of inbound rules 525A and the set of outbound rules 525B.

In some embodiments, presentation of the visual representation of the set of policies indicates that the set of policies is being enforced. In various embodiments, the set of security policies is enforced at the network edge, in the hypervisor vswitch layer, which ensures that all VM-to-VM traffic is inspected and that each policy is enforced at a point closest to the point at which the traffic originates. In some embodiments, policy enforcement is stateful in that the connection state is maintained for every traffic flow that is allowed. Stateful policy enforcement allows security policies to act on traffic flows, rather than on individual packets and also allows for return traffic for a traffic flow to be accurately identified and allowed without the need to write reflexive rules. When VMs are migrated between nodes or clusters, their associated connection states are also migrated to preserve existing connections.

FIG. 6 illustrates an alternative flowchart for presenting a visual representation of a set of security policies according to some embodiments of the invention. In some embodiments, the steps may be performed in an order different from that described in FIG. 6.

As shown in FIG. 6, the flowchart begins with the same four steps as the flowchart discussed with respect to FIG. 4. However, in addition to receiving a request to apply the set of security policies to the application via the graphical user interface 103, as described in step 420 in FIG. 4, in some embodiments, a request to perform additional actions with regard to the set of security policies may be received. In such embodiments, a request to monitor, apply, update, or delete one or more policies may be received at the graphical user interface 103 (in step 600). Upon receiving this request, a set of parameters corresponding to the request also may be received at the graphical user interface 103 (in step 605). Examples of such parameters include information identifying the policies to be updated or deleted, information identifying categories of target, source, or destination VMs associated with a policy that are to be modified, etc. For example, upon receiving a request to delete a security policy, information identifying the security policy to be deleted also may be received. Similar to FIG. 4, a visual representation of the set of security policies configured based at least in part on the request may then be presented in the graphical user interface (in step 425). In some embodiments, step 605 may be optional. For example, upon receiving a request to monitor a set of policies configured based at least in part on a set of inbound rules and a set of outbound rules received in steps 410 and 415, respectively, parameters corresponding to the request may be unnecessary in order to present a visual representation of the security policies being monitored in the graphical user interface (in step 425).

Figure 7:
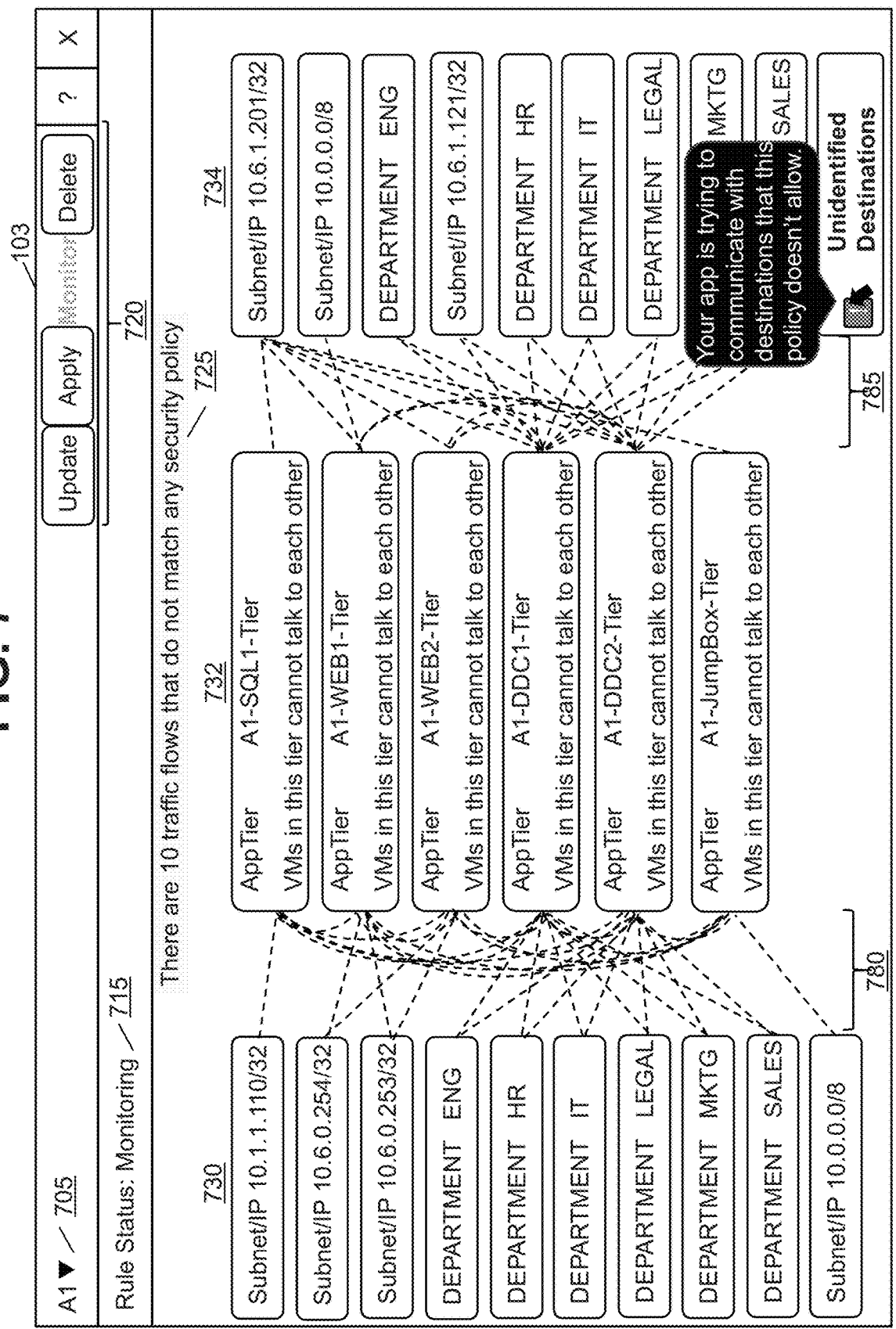
FIG. 7 illustrates an example of a graphical user interface for monitoring a set of security policies according to some embodiments of the invention.

FIG. 7 illustrates an example of a graphical user interface for monitoring a set of security policies according to some embodiments of the invention. In various embodiments, the graphical user interface may include more or fewer elements than depicted in FIG. 7. Furthermore, in some embodiments, the elements included in the graphical user interface (e.g., interactive elements, text, icons, images, etc.), formats, or arrangements of the elements may be different from those illustrated in FIG. 7. Moreover, in various embodiments, the graphical user interface may include more or fewer security policies than depicted in FIG. 7 and the types of security policies and categories of VMs associated with each type of security policy may differ from those depicted in FIG. 7.

The visual representation of the security policies being monitored in the graphical user interface 103 shown in FIG. 7 may include text that indicates that a set of security policies that have been created for application "A1" 705 are being monitored 715. In some embodiments, the graphical user interface 103 may include an interactive element (e.g., a down arrow button 705) that allows existing security policies created for a different application to be selected and a visual representation of the corresponding security policies to be presented in the graphical user interface 103. Furthermore, the graphical user interface 103 may include interactive elements 720 that allow the status of the existing security policies to be changed, such that the policies may be updated, applied, or deleted.

In various embodiments, each policy may be associated with a counter that indicates traffic that matches or does not match each policy (e.g., expressed in terms of packets, bytes, traffic flows, etc.). In such embodiments, the graphical user interface 103 also may include text that indicates any traffic that does not match any existing security policy. As shown in FIG. 7, text included in the graphical user interface 103 indicates that there are 10 traffic flows that do not match any security policies 725. In various embodiments, the graphical user interface 103 also may include text that indicates whether any existing security policies are being violated. As shown in FIG. 7, by hovering over the icon indicating that there is an event associated with an item corresponding to unidentified destinations that may require attention, text presented in the graphical user interface 103 may indicate that the application is trying to communicate with destination VMs that the policy does not allow. Based on information presented in the graphical user interface 103 that indicates if traffic does not match any security policies and if any existing security policies are being violated, a user may take an appropriate action (e.g., by creating a new security policy, by modifying existing security policies, etc.).

In some embodiments, additional visualization features that are not depicted in FIG. 7 also may be included in the graphical user interface 103. For example, in some embodiments, the traffic flows may be automatically grouped by applications or by application type (e.g., mail, file server, etc.), popular traffic flows may be identified, different traffic flows may be color coded to indicate which flows are adhering to existing policies and which flows are not, etc. Furthermore, the graphical user interface 103 may include various interactive elements allowing a user to set up alerts to indicate policy violations, to change the status of a policy (e.g., by changing the color of a traffic flow), to label applications or categories of VMs, etc. As described above, in embodiments in which a request to make a change with regard to a security policy or a category of VMs is received, information presented in the graphical user interface 103 may indicate any potential effects of the change.

Figure 8:
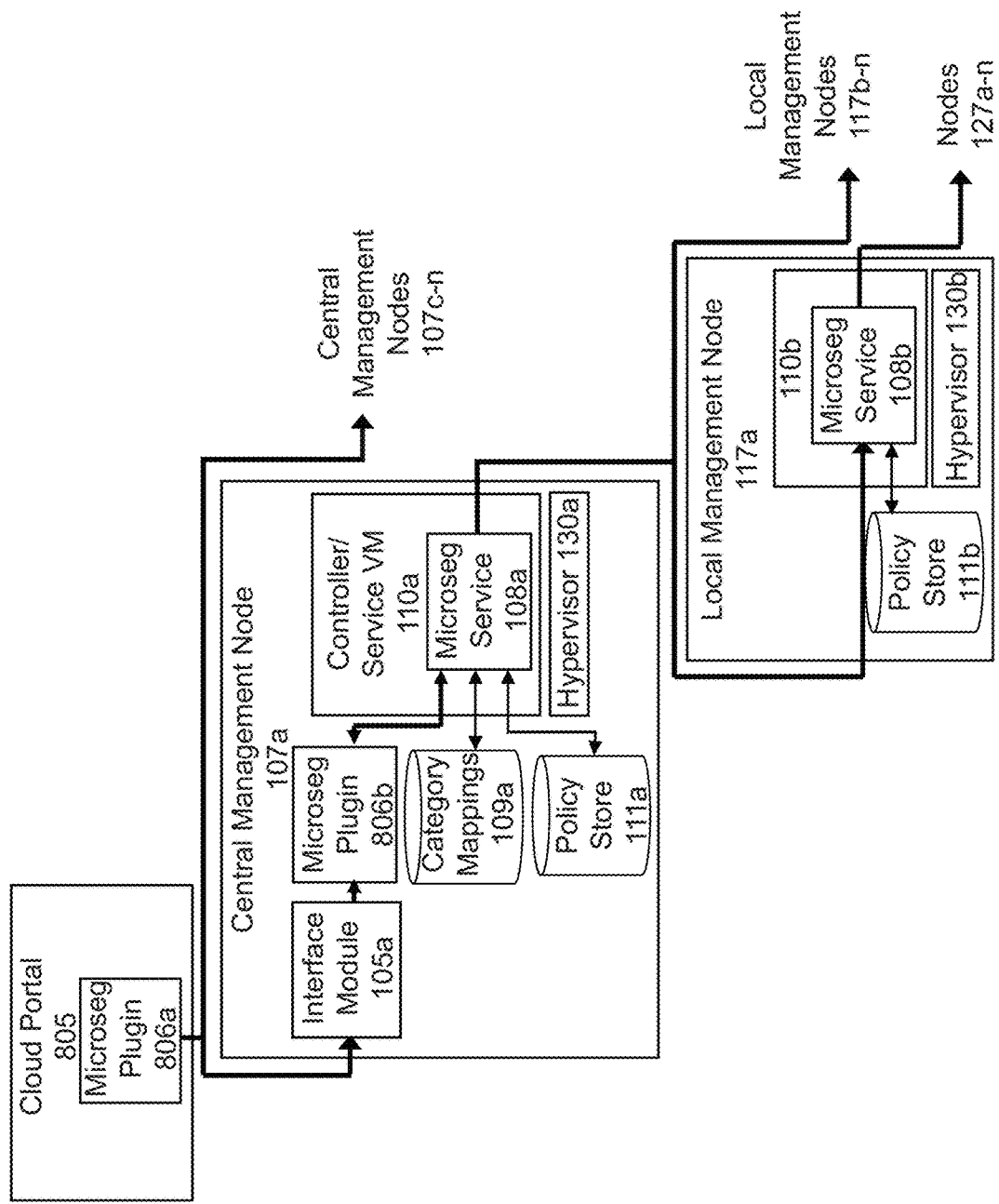
FIG. 8 illustrates an alternative clustered virtualization environment in which some embodiments of the invention are implemented.

FIG. 8 illustrates an alternative clustered virtualization environment in which some embodiments of the invention are implemented. In various embodiments, the clustered virtualization environment may include any number of central management nodes 107 and local management nodes 117 and each cluster 120 managed by a local management node 117 may include any number of nodes 127. Additionally, each node 127 may support any number of VMs 102. Furthermore, conventional components of clustered virtualization environments, such as operating systems, API layers, and the like are not shown so as to not obscure the components of the clustered virtualization environment to be discussed with regard to FIG. 8.

In some embodiments, applications for which security policies are created may require data that is stored in on-premises data centers and/or in cloud data centers to be accessed. Such applications include web-scale applications (e.g., multi-tiered applications that are used in cloud deployments). For example, one or more target VMs executing a web-scale application may access data stored in an on-premises data center and in a cloud data center. In embodiments in which an application executing in a clustered virtualization environment is used in a cloud deployment, the clustered virtualization environment also may include a cloud portal 805, as shown in FIG. 8. The cloud portal 805 may include a Microseg Plugin 806a, which is capable of communicating with a Microseg Plugin 806b in the central management nodes 107 via the interface module 105. The Microseg Plugin 806 may communicate with the Microseg Service 108 located on the central management nodes 107, as described above in conjunction with FIG. 1. Furthermore, in such embodiments, each central management node 107 may be associated with a specific site or datacenter location where cloud services are hosted. Thus, by adding a cloud portal 805 to the clustered virtualization environment, the approach discussed thus far for creating security policies using a visual approach may be extended to web-scale applications as well.

Figure 9A:
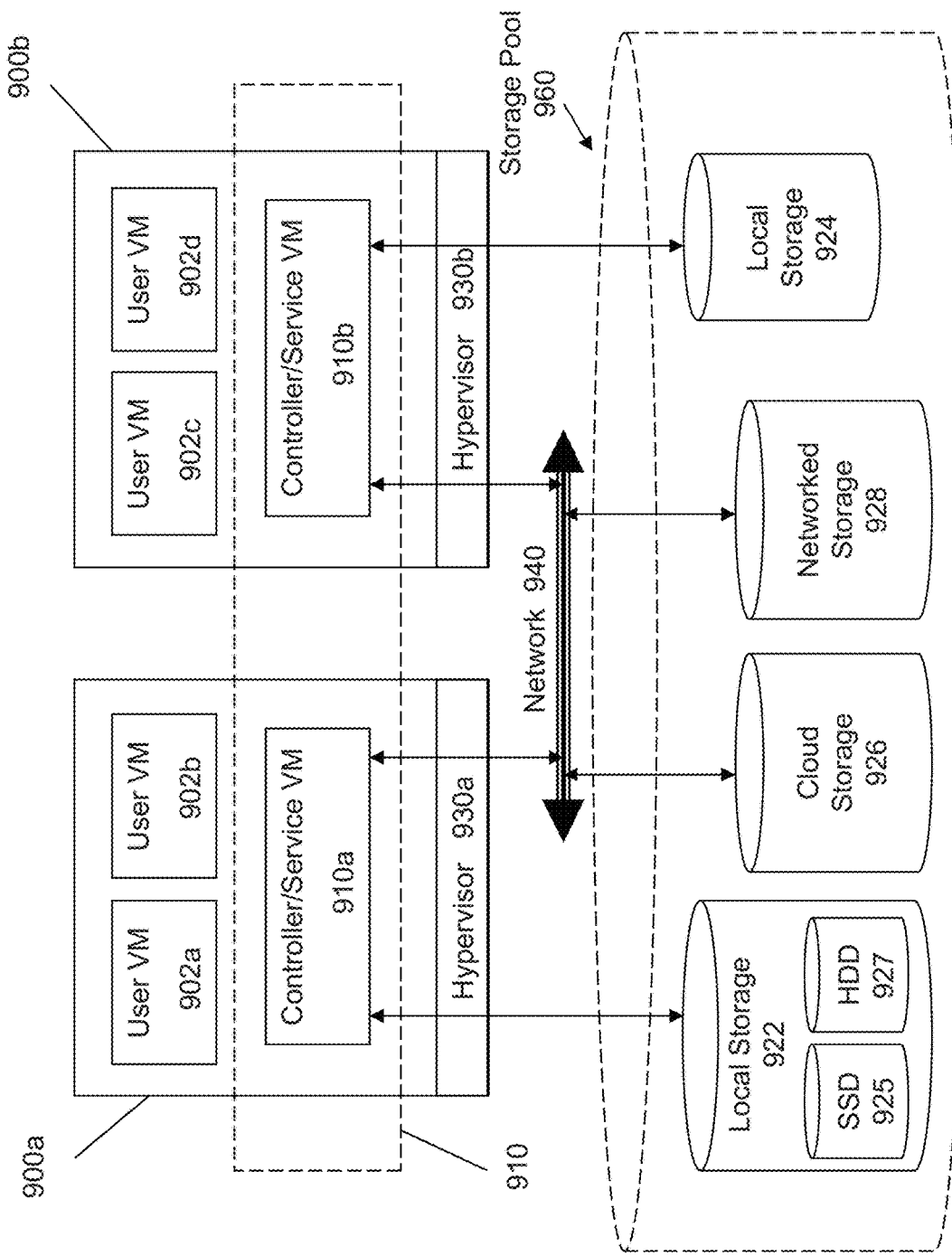
FIG. 9A illustrates an example networked virtualization system according to some embodiments of the invention.

FIG. 9A illustrates a networked virtualization environment in which some embodiments are implemented. In some embodiments, the approach for achieving hypervisor attached volume group load balancing may operate in a networked virtualization environment.

The architecture of FIG. 9A can be implemented for a distributed platform that contains multiple servers 900a and 900b that manages multiple-tiers of storage. The multiple tiers of storage may include storage that is accessible through a network 940, such as cloud storage 926 or networked storage 928 (e.g., a SAN or "storage area network"). Unlike the prior art, the present embodiment also permits local storage 922/924 that is within or directly attached to the server and/or appliance to be managed as part of the storage pool 960. Examples of such storage include Solid State Drives (henceforth "SSDs") 925 or Hard Disk Drives (henceforth "HDDs" or "spindle drives") 927. These collected storage devices, both local and networked, form a storage pool 960. Virtual disks (or "vDisks") can be structured from the storage devices in the storage pool 960, as described in more detail below. As used herein, the term vDisk refers to the storage abstraction that is exposed by a Controller/Service VM to be used by a user VM. In some embodiments, the vDisk is exposed via iSCSI ("internet small computer system interface") or NFS ("network file system") and is mounted as a virtual disk on the user VM.

Each server 900a or 900b runs virtualization software, such as VMware ESX(i), Microsoft Hyper-V, or RedHat KVM. The virtualization software includes a hypervisor 930a/930b to manage the interactions between the underlying hardware and the one or more user VMs 902a, 902b, 902c, and 902d that run client software.

A special VM 910a/910b is used to manage storage and I/O activities according to some embodiment of the invention, which is referred to herein as a "Controller/Service VM." This is the "Storage Controller" in the currently described architecture. Multiple such storage controllers coordinate within a cluster to form a single system. The Controller/Service VMs 910a/910b are not formed as part of specific implementations of hypervisors 930a/930b. Instead, the Controller/Service VMs run as virtual machines above hypervisors 930a/930b on the various servers 900a and 900b, and work together to form a distributed system 910 that manages all the storage resources, including the locally attached storage 922/924, the networked storage 928, and the cloud storage 926. Since the Controller/Service VMs run above the hypervisors 930a/930b, this means that the current approach can be used and implemented within any virtual machine architecture, since the Controller/Service VMs of embodiments of the invention can be used in conjunction with any hypervisor from any virtualization vendor.

Each Controller/Service VM 910a-b exports one or more block devices or NFS server targets that appear as disks to the client VMs 902a-d. These disks are virtual, since they are implemented by the software running inside the Controller/Service VMs 910a-b. Thus, to the user VMs 902a-d, the Controller/Service VMs 910a-b appear to be exporting a clustered storage appliance that contains some disks. All user data (including the operating system) in the client VMs 902a-d resides on these virtual disks.

Significant performance advantages can be gained by allowing the virtualization system to access and utilize local (e.g., server-internal) storage 922 as disclosed herein. This is because I/O performance is typically much faster when performing access to local storage 922 as compared to performing access to networked storage 928 across a network 940. This faster performance for locally attached storage 922 can be increased even further by using certain types of optimized local storage devices, such as SSDs 925. Further details regarding methods and mechanisms for implementing the virtualization environment illustrated in FIG. 9A are described in U.S. Pat. No. 8,601,473, which is hereby incorporated by reference in its entirety.

Figure 9B:
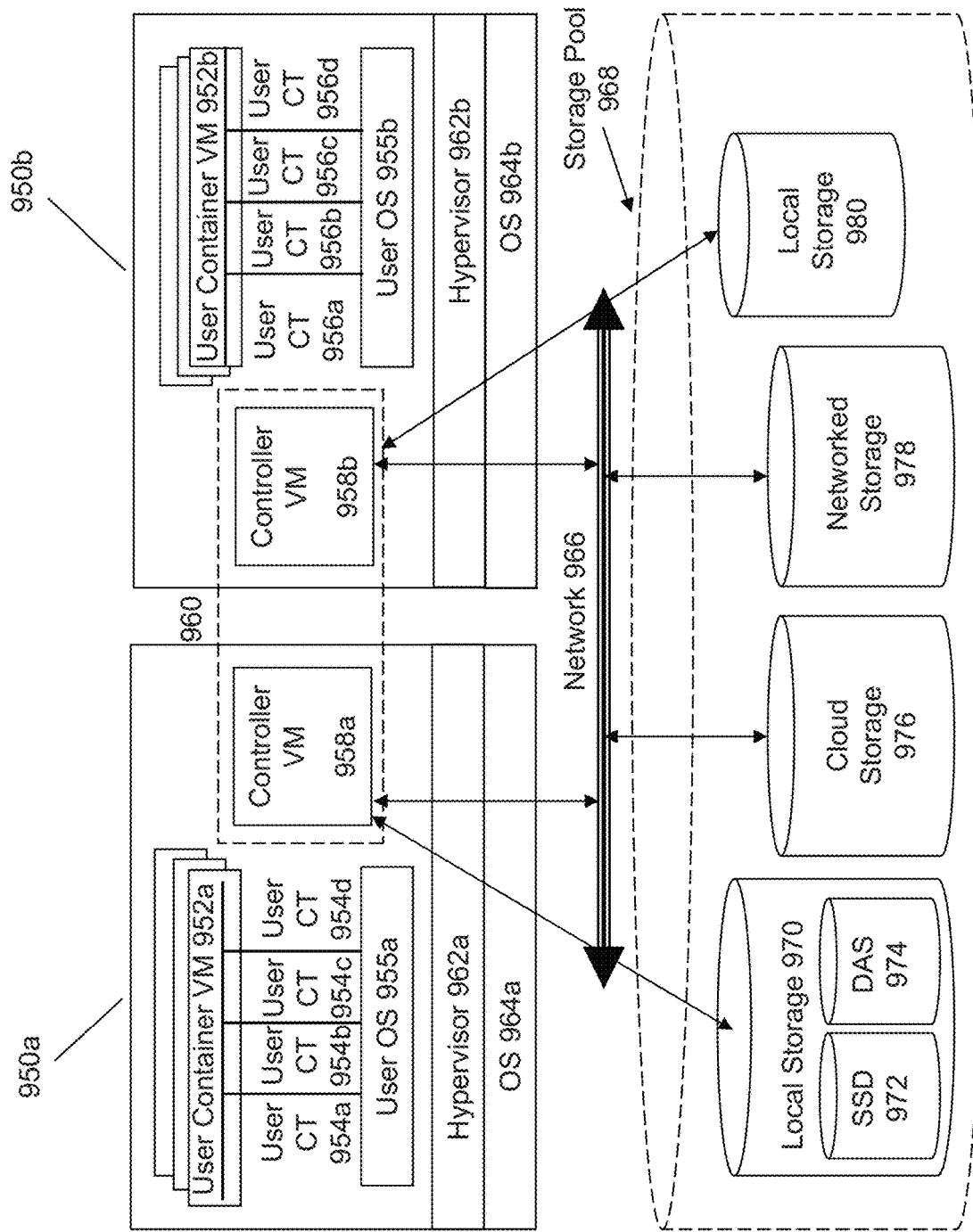
FIG. 9B illustrates an alternative example networked virtualization system according to some embodiments of the invention.

FIG. 9B illustrates an alternative approach for virtualized computing environments using containers. Generally, containers are a type of operating-system level application virtualization, in which the containers run applications in individual execution environments that are isolated from the host operating system and from each other. Some existing systems for running containerized applications include Linux LXC and Docker.

Containers running applications (e.g., containerized applications) have the benefit of being very fast to get up and running because no guest operating system must be installed for the application. The container may interface with the host computer or computers on a network through one or more virtualized network connections, which is managed by a container manager. For example, a web-server container may run a web-server application which is addressed by a IP addressed assigned to the container. To address or access the web-server container, a user or computer may use the IP address, which is intercepted by a container manager and routed to the container. Because the container is isolated from the host operating system, such as if the container application is compromised (e.g., hacked), the malicious entity doing the hacking will be trapped inside the container. However, to increase security, a containerized system may be implemented within a virtual machine. In this way, containerized applications can be quickly modified/updated within the container execution environment, and if one or more of the containers is breached, it will not affect the physical host computer because the container execution environment is still behind a virtual machine.

In FIG. 9B, an approach is illustrated for running containers within a distributed storage system, such as the system of FIG. 9A. Though FIG. 9B illustrates a particular architecture involving a controller virtual machine and user virtual machine which has user containers, one of ordinary skill in the art appreciates that other configurations may be implemented as well. Other approaches, and configurations are discussed in U.S. Application No. 62/171,990, filed on Jun. 5, 2015, which is hereby incorporated by reference in its entirety.

In FIG. 9B, a distributed platform contains multiple servers 950a and 950b that manage multiple-tiers of storage. In some embodiments, the servers 950a and 950b are physical machines with hardware layer such as memory or processors (not depicted) upon which an operating system may be installed. The managed multiple tiers of storage include storage that is accessible through a network 966, such as cloud storage 976 or networked storage 978 (e.g., a SAN or "storage area network"). Additionally, the present embodiment also permits local storage 970 and/or 980 that is within or directly attached to the server and/or appliance to be managed as part of the storage pool 968. Examples of such storage include SSDs 972, HDDs, "spindle drives," or other types of local storage that is directly attached (e.g., direct attached storage, DAS 974). These storage devices, both local and networked, collectively form a storage pool 968. Virtual disks (or "vDisks") can be structured from the storage devices in the storage pool 968, as described in more detail below. As used herein, the term vDisk refers to the storage abstraction that is exposed by a controller/service VM to be used by a user VM or a user container (CT). In some embodiments, the vDisk is exposed via iSCSI ("internet small computer system interface") or NFS ("network file system") and is mounted as a virtual disk on the user VM.

Each server 950a or 950b runs virtualization software, such as VMware ESX(i), Microsoft Hyper-V, or RedHat KVM. The virtualization software includes a hypervisor 962a-b to manage the interactions between the underlying hardware and the one or more user CTs that run client software, such as containerized applications.

The servers 950a-b may implement virtual machines with an operating system 964a-b that supports containers (e.g., Linux) and VM software, such as hypervisors 962a-b. In particular, as illustrated in FIG. 9A for example, node or server 950a runs a controller VM 958a and a user container VM 952a that runs one or more containers 954a-d from a user OS 955a. Each of the user containers may run a container image that may be layered to appear as a single file-system for that container. For example, a base layer may correspond to a Linux Ubuntu image, with an application execution layer on top; the application execution layer corresponding to a read/write execution environment for applications, such as MySQL, web servers, databases or other applications.

In some embodiments, the controller virtual machines 958a-b are used to manage storage and I/O activities for the user containers 954a-d. The controller virtualized computer is the "Storage Controller" in the currently described architecture. Multiple such storage controllers coordinate within a cluster to form a single-system. The Controller VMs 958a-b are not formed as part of specific implementations of respective hypervisors 962a-b. Instead, each controller VM runs as a virtual machine above its respective hypervisors 962a-b on the various servers 950a and 950b, and work together to form a distributed system 960 that manages all the storage resources, including the locally attached storage 970/980 the networked storage 978, and the cloud storage 976.

Each controller VM 958a-b exports one or more block devices or NFS server targets that appear as disks to the user container VM 952a-b. These disks are virtual, since they are implemented by the software running inside the controller VMs 958a-b. Thus, to the User-Container VMs 952a-b, the controller VMs 958a-b appear to be exporting a clustered storage appliance that contains some disks. All user data (including the operating system) in the user-container VMs 952a-b resides on these virtual disks. The containers run from within the respective user container VMs 952a-b may use the user OSs 955a-b to run isolated containerized directories. Further, each user OS 955a-b may have a container manager installed (e.g., Docker, LXC) to run/manage containers on each respective user container VM 952a-b.

Significant performance advantages can be gained by allowing the virtualization system to access and utilize local (e.g., server-internal) storage 970 as disclosed herein. This is because I/O performance is typically much faster when performing access to local storage 970 as compared to performing access to networked storage 978 across a network 966. This faster performance for locally attached storage 970 can be increased even further by using certain types of optimized local storage devices, such as SSDs 972.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 970. On the other hand, data that does not require fast access or which is accessed infrequently can be stored in the networked storage devices 978 or in cloud storage 976. Further details regarding an exemplary approach for implementing the virtualization environment are described in U.S. Pat. No. 8,601,473, which is hereby incorporated by reference in its entirety.

In this way, the security and robustness of a distributed storage system using virtual machines (as illustrated in FIG. 9A) may be combined with efficiency and consistency of a container virtualized computer/application environment.

FIG. 10 illustrates a system 1000 to implement a virtualization management console 1005 according to some embodiments of the invention.

The system 1000 includes one or more users at one or more user stations 1002 that use the system 1000 to operate the virtualization system 1000 and/or management console 1005. The user station 1002 comprises any type of computing station that may be used to operate or interface with the system 1000. Examples of such user stations include, for example, workstations, personal computers, or remote computing terminals. The user station 1002 comprises a display device, such as a display monitor, for displaying a user interface to users at the user station. The user station 1002 also comprises one or more input devices for the user to provide operational control over the activities of the system 1000, such as a mouse or keyboard to manipulate a pointing object in a graphical user interface.

System 1000 includes virtualization infrastructure 1006, comprising any processing components necessary to implement and provision one or more VMs 1003. This may include management components to obtain the status of, to configure, and/or to control the operation of one or more storage controllers and/or storage mediums 1010. Data for the VMs 1003 are stored in a tangible computer readable storage device 1010. The computer readable storage device 1010 comprises any combination of hardware and software that allows for ready access to the data that is located at the computer readable storage device 1010. The storage controller 1008 is used to manage the access and operation of the computer readable storage device 1010. While the storage controller is shown as a separate component here, it is noted that any suitable storage controller configuration may be employed. For example, in some embodiments, the storage controller can be implemented as a virtual machine as described in more detail below. As noted in more detail below, the virtualization infrastructure 1006 may correspond to a cluster of multiple nodes that are integrated as a single system.

System 1000 includes a management console 1005 included in a management node 1007. The management console 1005 provides an interface that permits an administrator to manage and administer the operation of the system. According to some embodiments, the management console 1005 comprises a javascript program that is executed to display a management user interface within a web browser at the user station 1002. In some embodiments, the storage controller exposes an API or GUI to create, read, update, delete (CRUD) data stores at the computer readable medium 1010, which can be managed by the management console 1005.

In operation in some embodiments, a web browser at the user station 1002 is used to display a web-based user interface for the management console. The management console 1005 corresponds to javascript code to implement the user interface. Metadata regarding the system 1000 is maintained at a data store 1011, which collects data relating to the virtualization infrastructure 1006, the storage mediums 1010, and/or datastores at the storage mediums. The javascript code interacts with a gateway 1023 to obtain the metadata to be displayed in the user interface. In some embodiments, the gateway comprises a web server and servlet container, e.g., implemented using Apache Tomcat. Further details regarding methods and mechanisms for implementing virtualization management console illustrated in FIG. 10 are described in U.S. Provisional Patent Application No. 62/108,515, which is hereby incorporated by reference in its entirety.

Figure 11:
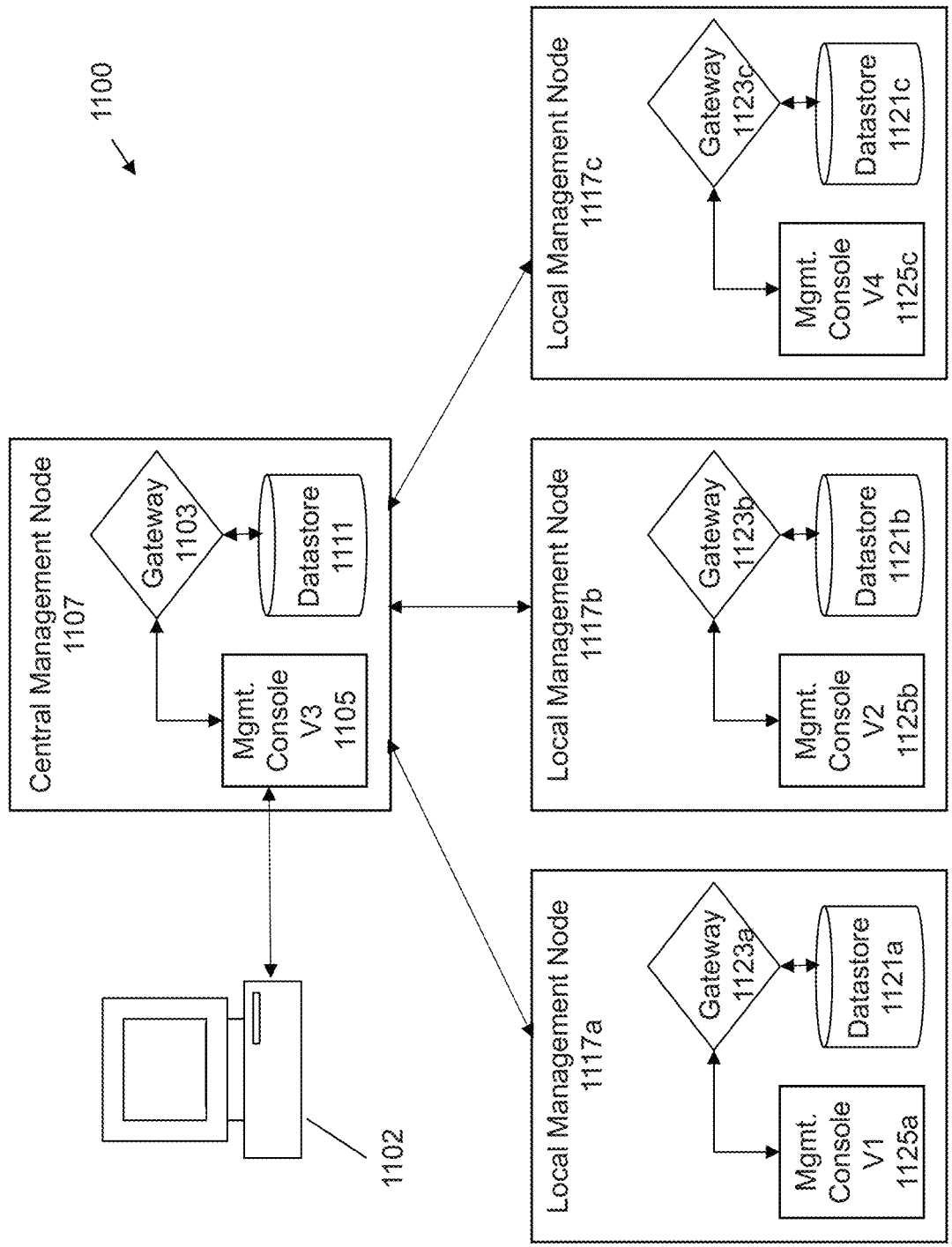
FIG. 11 illustrates a computing environment having multiple underlying systems/clusters to be managed, where a separate management node exists for each of the underlying systems/clusters.

FIG. 11 illustrates a larger computing environment having multiple underlying systems/clusters that need to be managed, where a separate management node exists for each of the underlying systems/clusters.

Similar to FIG. 10, the system 1100 includes one or more users at one or more user stations 1102 that use the system 1100 to operate the virtualization system 1100 and/or management console 1105. The user station 1102 comprises any type of computing station that may be used to operate or interface with the system 1100 and a display device, such as a display monitor, for displaying a user interface to users at the user station. The user station 1102 also comprises one or more input devices for the user to provide operational control over the activities of the system 1100, as described above.

The approach for hypervisor attached volume group load balancing may be performed in an environment including a central management node 1107 for one or more clusters that includes its own management console 1105, gateway 1103, and datastore 1111. Shown here are local management nodes 1117a, 1117b, and 1117c. Each of these management nodes includes its own management console 1125a-c, gateway 1123a-c, and datastore 1121a-c. Further details regarding methods and mechanisms for implementing virtualization management console illustrated in FIG. 11 are described in U.S. Provisional Patent Application No. 62/108,515, which is hereby incorporated by reference in its entirety.

System Architecture

Figure 12:
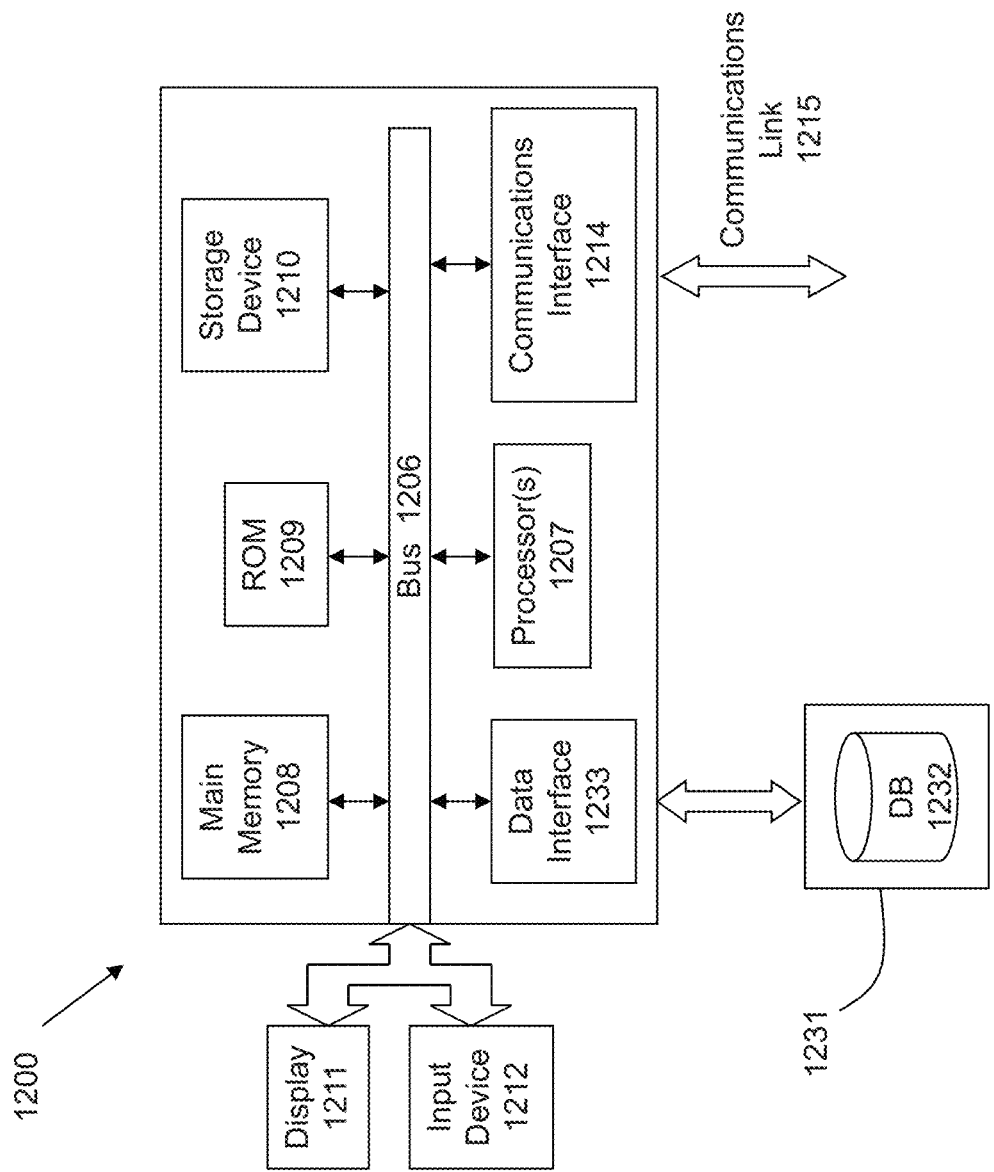
FIG. 12 is a block diagram of a computing system suitable for implementing an embodiment of the present invention.

FIG. 12 is a block diagram of an illustrative computing system 1200 suitable for implementing an embodiment of the present invention. Computer system 1200 includes a bus 1206 or other communication mechanism for communicating information, which interconnects subsystems and devices, such as processor 1207, system memory 1208 (e.g., RAM), static storage device 1209 (e.g., ROM), disk drive 1210 (e.g., magnetic or optical), communication interface 1214 (e.g., modem or Ethernet card), display 1211 (e.g., CRT or LCD), input device 1212 (e.g., keyboard), and cursor control.

According to some embodiments of the invention, computer system 1200 performs specific operations by processor 1207 executing one or more sequences of one or more instructions contained in system memory 1208. Such instructions may be read into system memory 1208 from another computer readable/usable medium, such as static storage device 1209 or disk drive 1210. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1207 for execution. Such a medium may take many forms, including but not limited to, non-volatile media and volatile media. Non-volatile media includes, for example, optical or magnetic disks, such as disk drive 1210. Volatile media includes dynamic memory, such as system memory 1208.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1200. According to other embodiments of the invention, two or more computer systems 1200 coupled by communication link 1210 (e.g., LAN, PTSN, or wireless network) may perform the sequence of instructions required to practice the invention in coordination with one another.

Computer system 1200 may transmit and receive messages, data, and instructions, including program, i.e., application code, through communication link 1215 and communication interface 1214. Received program code may be executed by processor 1207 as it is received, and/or stored in disk drive 1210, or other non-volatile storage for later execution. A database 1232 in a storage medium 1231 may be used to store data accessible by the system 1200.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method comprising:
receiving, at a graphical user interface for creating a security policy for an application in a virtualization environment, information identifying a source virtual machine category or a destination virtual machine category, and a target virtual machine, the target virtual machine having at least a portion of the application; and presenting a visual representation of the security policy in the graphical user interface, the security policy configured based at least in part on an inbound rule or an outbound rule, the visual representation comprising a first portion for visually representing a list of security policies including at least a policy type and a policy status and a second portion visually representing at least a whitelisted source or destination virtual machine and the target virtual machine:

wherein the inbound rule identifies an inbound category of a source virtual machine that is permitted to initiate an inbound connection to the target virtual machine, the outbound rule identifies an outbound category of a destination virtual machine to which the target virtual machine is permitted to initiate an outbound connection, and the visual representation is for displaying at least one of whether the source virtual machine category for a virtual machine matches the inbound category or whether the destination virtual machine category for the virtual machine matches the outbound category.

2. The method of claim 1, wherein the visual representation is for displaying both of whether the source virtual machine category for a virtual machine matches the inbound category and whether the destination virtual machine category for the virtual machine matches the outbound category.

3. The method of claim 1, wherein the target virtual machine is associated with a tier of a plurality of tiers within the application.

4. The method of claim 3, wherein the security policy is further based at least in part on a rule identifying an additional subset of the target virtual machine to which the additional subset of the target virtual machine is permitted to initiate a connection or is restricted from initiating the connection, wherein the target virtual machine and the additional subset of the target virtual machine are associated with different tiers of the plurality of tiers within the application.

5. The method of claim 1, wherein the inbound rule or the outbound rule is applied to a communication to determine whether the communication should be allowed.

6. The method of claim 1, further comprising:
presenting the visual representation of the security policy in the graphical user interface corresponding to an additional security policy request, wherein the additional security policy request corresponds to one or more of: monitoring the security policy, applying the security policy, updating a security policy, or deleting the security policy.

7. The method of claim 1, wherein the visual representation of the security policy comprises at least one of: additional information indicating a traffic flow that does not match the security policy or indicating a violation of the security policy.

8. A computer program product embodied on a non-transitory computer readable medium having stored thereon a sequence of instructions which, when executed by a processor causes a set of acts comprising:
receiving, at a graphical user interface for creating a security policy for an application in a virtualization environment, information identifying a source virtual machine category or a destination virtual machine category, and a target virtual machine, the target virtual machine having at least a portion of the application; and presenting a visual representation of the security policy in the graphical user interface, the security policy configured based at least in part on an inbound rule or an outbound rule, the visual representation comprising a first portion for visually representing a list of security policies including at least a policy type and a policy status and a second portion visually representing at least a whitelisted source or destination virtual machine and the target virtual machine:

wherein the inbound rule identifies an inbound category of a source virtual machine that is permitted to initiate an inbound connection to the target virtual machine, the outbound rule identifies an outbound category of a destination virtual machine to which the target virtual machine is permitted to initiate an outbound connection, and the visual representation is for displaying at least one of whether the source virtual machine category for a virtual machine matches the inbound category or whether the destination virtual machine category for the virtual machine matches the outbound category.

9. The computer program product of claim 8, wherein the visual representation is for displaying both of whether the source virtual machine category for a virtual machine matches the inbound category and whether the destination virtual machine category for the virtual machine matches the outbound category.

10. The computer program product of claim 8, wherein the target virtual machine is associated with a tier of a plurality of tiers within the application.

11. The computer program product of claim 10, wherein the security policy is further based at least in part on a rule identifying an additional subset of the target virtual machine to which the additional subset of the target virtual machine is permitted to initiate a connection or is restricted from initiating the connection, wherein the target virtual machine and the additional subset of the target virtual machine are associated with different tiers of the plurality of tiers within the application.

12. The computer program product of claim 8, wherein the inbound rule or the outbound rule is applied to a communication to determine whether the communication should be allowed.

13. The computer program product of claim 8, wherein the set of acts further comprise:
presenting the visual representation of the security policy in the graphical user interface corresponding to an additional security policy request, wherein the additional security policy request corresponds to one or more of: monitoring the security policy, applying the security policy, updating a security policy, or deleting the security policy.

14. The computer program product of claim 8, wherein the visual representation of the security policy comprises at least one of: additional information indicating a traffic flow that does not match the security policy or indicating a violation of the security policy.

15. A computer system, comprising:
a processor;
a memory for holding a set of instructions; and
wherein the set of instructions include instructions for:
receiving, at a graphical user interface for creating a security policy for an application in a virtualization environment, information identifying a source virtual machine category or a destination virtual machine category, and a target virtual machine, the target virtual machine having at least a portion of the application; and presenting a visual representation of the security policy in the graphical user interface, the security policy configured based at least in part on an inbound rule or an outbound rule, the visual representation comprising a first portion for visually representing a list of security policies including at least a policy type and a policy status and a second portion visually representing at least a whitelisted source or destination virtual machine and the target virtual machine:
wherein the inbound rule identifies an inbound category of a source virtual machine that is permitted to initiate an inbound connection to the target virtual machine, the outbound rule identifies an outbound category of a destination virtual machine to which the target virtual machine is permitted to initiate an outbound connection, and the visual representation is for displaying at least one of whether the source virtual machine category for a virtual machine matches the inbound category or whether the destination virtual machine category for the virtual machine matches the outbound category.

16. The computer system of claim 15, wherein the visual representation is for displaying both of whether the source virtual machine category for a virtual machine matches the inbound category and whether the destination virtual machine category for the virtual machine matches the outbound category.

17. The computer system of claim 15, wherein the target virtual machine is associated with a tier of a plurality of tiers within the application.

18. The computer system of claim 17, wherein the security policy is further based at least in part on a rule identifying an additional subset of the target virtual machine to which the additional subset of the target virtual machine is permitted to initiate a connection or is restricted from initiating the connection, wherein the target virtual machine and the additional subset of the target virtual machine are associated with different tiers of the plurality of tiers within the application.

19. The computer system of claim 15, wherein the inbound rule or the outbound rule is applied to a communication to determine whether the communication should be allowed.

20. The computer system of claim 15,
wherein the set of instructions further include instructions for:
presenting the visual representation of the security policy in the graphical user interface corresponding to an additional security policy request, wherein the additional security policy request corresponds to one or more of: monitoring the security policy, applying the security policy, updating a security policy, or deleting the security policy.

21. The computer system of claim 15, wherein the visual representation of the security policy comprises at least one of: additional information indicating a traffic flow that does not match the security policy or indicating a violation of the security policy.

* * * * *